(12) United States Patent
Tsushima et al.

(10) Patent No.: US 8,307,369 B2
(45) Date of Patent: Nov. 6, 2012

(54) POWER CONTROL METHOD FOR VIRTUAL MACHINE AND VIRTUAL COMPUTER SYSTEM

(75) Inventors: Yuji Tsushima, Hachioji (JP); Keitaro Uehara, Kokubunji (JP); Toshiomi Moriki, Kokubunji (JP); Naoya Hattori, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 990 days.

(21) Appl. No.: 12/328,121

(22) Filed: Dec. 4, 2008

(65) Prior Publication Data

US 2009/0150896 A1 Jun. 11, 2009

(30) Foreign Application Priority Data

Dec. 5, 2007 (JP) ................................. 2007-314761

(51) Int. Cl.
G06F 9/50 (2006.01)
(52) U.S. Cl. ............................. 718/104; 718/1; 718/105
(58) Field of Classification Search .............. 718/1, 104, 718/105
See application file for complete search history.

(56) References Cited

U.S. PATENT DOCUMENTS

| 7,194,641 B2 * | 3/2007 | Hack .............................. 713/300 |
| 7,680,643 B2 * | 3/2010 | Ragnunath et al. ............. 703/20 |
| 8,112,750 B2 * | 2/2012 | Hayakawa et al. ................ 718/1 |
| 8,151,275 B2 * | 4/2012 | Yokota ........................... 718/108 |
| 2004/0111596 A1 | 6/2004 | Rawson, III |
| 2005/0060590 A1 | 3/2005 | Bradley et al. |
| 2005/0108711 A1 * | 5/2005 | Arnold et al. ................. 718/100 |
| 2006/0075207 A1 * | 4/2006 | Togawa et al. ................ 711/202 |
| 2006/0085794 A1 | 4/2006 | Yokoyama |
| 2006/0294401 A1 | 12/2006 | Munger |
| 2008/0163206 A1 * | 7/2008 | Nair ................................. 718/1 |
| 2008/0209168 A1 * | 8/2008 | Yokota ............................ 712/30 |

FOREIGN PATENT DOCUMENTS

| GB | 2427724 | 1/2007 |
| JP | 07281781 A * | 10/1995 |
| JP | 9179667 | 7/1997 |
| JP | 2006-113767 | 4/2006 |

OTHER PUBLICATIONS

"VMware ESX Server" published by VMware, Inc., URL:http://www.vmware.com/files/jp/pdf/esx_datasheet.pdf.
XEN 3.3 Data Sheet.

(Continued)

Primary Examiner — Aimee Li
(74) Attorney, Agent, or Firm — Brundidge & Stanger, P.C.

(57) ABSTRACT

Provided is a method of controlling a virtual computer system in which a physical computer includes a plurality of physical CPUs that is switchable between a sleep state and a normal state, and a virtualization control unit divides the physical computer into a plurality of logical partitions to run a guest OS in each of the logical partitions and controls allocation of resources of the physical computer to the logical partitions, causes the virtualization control unit to: receive an operation instruction for operating the logical partitions; and if the operation instruction is for deleting a virtual CPU from one of the logical partitions, delete this virtual CPU from a table for managing virtual CPU-physical CPU allocation and put, if the deleting leaves no virtual CPUs allocated to one of the physical CPUs that has been allocated the deleted virtual CPU, this one of the physical CPUs into the sleep state.

18 Claims, 16 Drawing Sheets

OTHER PUBLICATIONS

Search Report in European Application No. 08021082.6-2211, dated Apr. 24, 2009.

Nathuji et al., "VirtualPower: Coordinated Power Management in Virtualized Enterprise Systems", Symposium on Operating Systems Principles, [Online], Oct. 2007, pp. 265-278 (retrieved from the Internet: URL: http://www.sosp2007.org/papers/sosp111).

Japanese Office Action mailed Aug. 14, 2012 in corresponding Japanese Patent Application No. 2007-314761 with English language translation.

* cited by examiner

341 VIRTUAL CPU-PHYSICAL CPU ALLOCATION TABLE

| PHYSICAL CPU # | STATE | ASSOCIATED VIRTUAL CPU LIST | | | | | |
|---|---|---|---|---|---|---|---|
| | | VIRTUAL CPU # | ALLOCATION RATIO | VIRTUAL CPU # | ALLOCATION RATIO | ... | ... |
| 1 | NORMAL | 1 | 40% | 3 | 20% | | |
| 2 | SLEEP | NONE | 0% | NONE | 0% | | |
| 3 | NORMAL | 4 | 20% | 2 | 40% | | |

342 LPAR ASSOCIATION TABLE

| LPAR # | VIRTUAL CPU LIST | | | |
|---|---|---|---|---|
| | VIRTUAL CPU # | VIRTUAL CPU # | ......... | ......... |
| 1 | 1 | 2 | | |
| 2 | 3 | 4 | | |
| ......... | ......... | ......... | | |

341A VIRTUAL CPU-PHYSICAL CPU ALLOCATION TABLE

| PHYSICAL CPU # | STATE | OPERATING FREQUENCY | ASSOCIATED VIRTUAL CPU LIST | | | | | |
|---|---|---|---|---|---|---|---|---|
| | | | VIRTUAL CPU # | ALLOCATION RATIO | VIRTUAL CPU # | ALLOCATION RATIO | ⋮ | ⋮ |
| 1 | NORMAL | 60% | 1 | 40% | 3 | 20% | | |
| 2 | SLEEP | 0% | NONE | 0% | NONE | 0% | | |
| 3 | NORMAL | 60% | 4 | 20% | 2 | 40% | | |
| 3410 | 3411 | 3414 | 3412 | 3413 | 3412 | 3413 | | |

FIG. 7

341B VIRTUAL CPU-PHYSICAL CPU ALLOCATION TABLE

| PHYSICAL CPU # | STATE | ASSOCIATED VIRTUAL CPU LIST ||||| |||| |
| --- | --- | --- | --- | --- | --- | --- | --- | --- | --- |
| | | VIRTUAL CPU # | ALLOCATION RATIO | OPERATION RATIO | ACTUAL UTILIZATION RATIO | VIRTUAL CPU # | ALLOCATION RATIO | OPERATION RATIO | ACTUAL UTILIZATION RATIO |
| 1 | NORMAL | 1 | 50% | 50% | 25% | 3 | 30% | 30% | 9% |
| 2 | SLEEP | NONE | 0% | 0% | 0% | NONE | 0% | 0% | 0% |
| 3 | NORMAL | 4 | 40% | 20% | 8% | 2 | 40% | 50% | 20% |
| 3410 | 3411 | 3412 | 3413 | 3415 | 3416 | 3412 | 3413 | 3415 | 3416 |

FIG. 14

| | | | | |
|---|---|---|---|---|
| ASSOCIATED VIRTUAL CPU LIST | ACTUAL UTILIZATION RATIO | 8% | 0% | 0% |
| | OPERATION RATIO | 20% | 0% | 0% |
| | ALLOCATION RATIO | 40% | 0% | 0% |
| | VIRTUAL CPU # | 4 | NONE | NONE |
| | ACTUAL UTILIZATION RATIO | 9% | 0% | 0% |
| | OPERATION RATIO | 30% | 0% | 0% |
| | ALLOCATION RATIO | 30% | 0% | 0% |
| | VIRTUAL CPU # | 3 | NONE | NONE |
| | ACTUAL UTILIZATION RATIO | 25% | 0% | 8% |
| | OPERATION RATIO | 50% | 0% | 0% |
| | ALLOCATION RATIO | 50% | 0% | 0% |
| | VIRTUAL CPU # | 1 | NONE | NONE |
| | STATE | NORMAL | SLEEP | SLEEP |
| | PHYSICAL CPU # | 1 | 2 | 3 |

*FIG. 17*

POWER CONTROL METHOD FOR VIRTUAL MACHINE AND VIRTUAL COMPUTER SYSTEM

CLAIM OF PRIORITY

The present application claims priority from Japanese application P2007-314761 filed on Dec. 5, 2007, the content of which is hereby incorporated by reference into this application.

BACKGROUND OF THE INVENTION

This invention relates to improving a type of virtual computer system that runs guest OSs on a plurality of physical computers.

The recent computers consume more electric power as the performance of processors (CPUs) becomes higher. In particular, CPUs for server use which are equipped with a large-capacity cache memory have high performance but consume a great deal of power. Power consumption in a server where a plurality of CPUs are installed is even greater. In data centers and other facilities that run a large number of servers, large power consumption in the servers has an accordingly large influence on server installation conditions, cooling, and the like.

IT systems using a server are generally designed according to the peak CPU performance. Consequently, the number of servers with a low CPU operation ratio is large in data centers and other facilities that run a large number of servers. While the recent CPUs employ a technique of reducing power consumption by changing the operating clock or changing the drive voltage of the CPU, a light-load state (e.g., idling state or standby state) does not equal zero power consumption. This is why server virtualization (virtual machine) technology which improves the CPU operation ratio by integrating a plurality of servers into one server is attracting attention.

Known examples of the server virtualization technology include VMware® ESX Server which runs a plurality of guest OSs on a host OS as disclosed in an Internet article titled "VMware ESX Server", published by VMware, Inc., and retrieved at URL: http://www.vmware.com/files/jp/pdf/esx_datasheet.pdf, on Nov. 1, 2007 (hereinafter referred to as Non-patent Document 1), and in JP 2006-113767 A. A known example of the virtualization technology that uses a hypervisor is Xen by XenSource, Inc. (now Citric Systems, Inc.) as disclosed in an Internet article titled "Xen 3.0 Datasheet", published by XenSource, Inc., and retrieved at URL: http://www.vmware.com/files/jp/pdf/esx_datasheet.pdf, on Nov. 1, 2007 (hereinafter referred to as Non-patent Document 2).

SUMMARY OF THE INVENTION

In Non-patent Document 1, processing of allocating a virtual CPU to a physical CPU is dependent on a scheduler of the host OS (VM kernel). In JP 2006-113767 A, a guest OS is run on a management OS and the management OS executes the power control and clock control of a physical CPU according to an instruction from the guest OS so that the power consumption of virtual machines is reduced.

In Non-patent Document 2, a hypervisor allocates a virtual CPU to a physical CPU through real time scheduling by a scheduler such as Simple Early Deadline First scheduler (SEDF) or Borrowed Virtual Timer scheduler (BVT).

In the conventional example of Non-patent Document 1, management of virtual CPUs and physical CPUs is performed by the host OS, which means that virtualization software running on the host OS cannot control physical CPUs in a manner that takes power consumption into consideration. Furthermore, which physical CPU is allocated a virtual CPU that is used by a virtual server, too is dependent on the scheduler of the host OS. It is therefore difficult in this conventional example to reduce power consumption by controlling the allocation of virtual CPUs to physical CPUs with virtualization software.

The conventional example of Non-patent Document 2, where a hypervisor controls the allocation of a virtual CPU used by a virtual server to a physical CPU, is capable of power-saving allocation. However, the real time scheduling used in Non-patent Document 2 allows a virtual CPU to be allocated to a physical CPU at any time when a virtual server makes the request. This means that physical CPUs are always in operation and keep consuming power when there are no commands to be executed, in other words, when no virtual CPUs are allocated to the physical CPUs.

In the conventional example of JP 2006-113767 A, the processing of reducing the power consumption of a physical CPU is performed by the management OS, but is triggered by an instruction from a guest OS to be followed by the management OS in controlling the power and clock of the physical CPU. Therefore, the management OS does not execute the processing of reducing the power consumption of a physical CPU unless a guest OS gives the instruction, and hence reducing power consumption throughout the virtual computer system is not possible in this conventional example.

This invention has been made in view of the above, and it is therefore an object of this invention to reduce power consumption in a virtual computer system by controlling the association between a virtual CPU and a physical CPU in a manner that optimizes the number of physical CPUs to which no virtual CPUs are allocated throughout the virtual computer system.

According to this invention, a virtual computer system comprising: a physical computer including a plurality of physical CPUs that is switchable between a sleep state and a normal state; and a virtualization control unit which divides the physical computer into a plurality of logical partitions to run a guest OS in each of the plurality of logical partitions, and which controls allocation of resources of the physical computer to the plurality of logical partitions, wherein the virtualization control unit includes: a logical partition control unit which receives an operation instruction for operating the plurality of logical partitions; a virtual CPU control unit which allocates virtual CPUs to the plurality of logical partitions based on the operation instruction, the virtual CPUs each executing the guest OS; a virtual CPU-physical CPU allocation unit which allocates the virtual CPUs to the plurality of physical CPUs based on the operation instruction, and which controls operation states of the plurality of physical CPUs; and a physical CPU control unit which controls the operation states of the plurality of physical CPUs based on the operation instruction from the virtual CPU-physical CPU allocation unit, wherein the virtual CPU-physical CPU allocation unit is configured to: judge, upon reception of the operation instruction from the logical partition control unit to create a virtual CPU, whether or not the virtual CPU to be created can be allocated to any one of the plurality of physical CPUs that is in the normal state; allocate the created virtual CPU to the any one of the plurality of physical CPUs that is in the normal state in a case where the allocation is executable; issue an instruction to the physical CPU control unit to activate one of the plurality of physical CPUs that is in the sleep state, and allocate the created virtual CPU to the activated one of the plurality of physical CPUs in a case where the allocation is not executable; and update a table for managing virtual CPU-physical CPU allocation and the operation states of the plurality of physical CPUs by adding the newly allocated virtual CPU to the table, and wherein the virtual CPU-physical CPU allocation unit is configured to: delete, upon reception of the operation instruction from the logical partition control unit to delete a virtual CPU, the virtual CPU from the table; and instruct the physical CPU control unit to put the one of the plurality of physical CPUs into the sleep state in a case where the deletion leaves no virtual CPUs allocated to one of the plurality of physical CPUs that has been allocated the deleted virtual CPU.

In this way, when a virtual CPU is deleted after the virtual CPU is allocated to a logical partition and a physical CPU that has been allocated the deleted virtual CPU has no other virtual CPUs allocated, the physical CPU is put into a sleep state. This invention can thus actively reduce the power consumption of physical computers.

Further, in the case where a first physical CPU is allocated a second virtual CPU other than a deleted virtual CPU and it is possible to allocate the second virtual CPU to a second physical CPU which is in a normal state, the second virtual CPU is reallocated to the second physical CPU and the first physical CPU is shifted to a sleep state after no virtual CPUs remain allocated to the first physical CPU. Physical CPUs in a sleep state are thus created actively, and hence the power consumption of physical computers is reduced by optimizing virtual CPU allocation.

Furthermore, in the case where the virtual CPU operation ratio is to be obtained in reallocating the second virtual CPU to the second physical CPU, the virtual CPU allocation ratio can exceed 100% as long as the combined operation ratio of virtual CPUs allocated to the second physical CPU is smaller than a threshold. Virtual CPUs can thus be reallocated even more efficiently, and hence the power consumption of physical computers is reduced by maximizing the number of physical CPUs that are in a sleep state.

BRIEF DESCRIPTION OF THE DRAWINGS

FIG. 3 is an explanatory diagram illustrating an example of a virtual CPU-physical CPU allocation table that is managed by virtualization software according to the first embodiment.

FIG. 4 is an explanatory diagram illustrating an example of a logical partition association table that is managed by virtualization software according to the first embodiment.

FIG. 7 is an explanatory diagram illustrating the configuration of the virtual CPU-physical CPU allocation table which is managed by the virtual CPU-physical CPU allocation unit according to the second embodiment.

FIG. 14 is an explanatory diagram illustrating an example of a virtual CPU-physical CPU allocation table that is managed by virtualization software according to the fourth embodiment.

FIG. 17 is an explanatory diagram illustrating an example of how the virtual CPU-physical CPU allocation table managed by the virtualization software looks after the virtual CPU deletion processing is executed according to the fourth embodiment.

DETAILED DESCRIPTION OF THE PREFERRED EMBODIMENTS

Embodiments of this invention will be described below with reference to the accompanying drawings.

Figure 1:
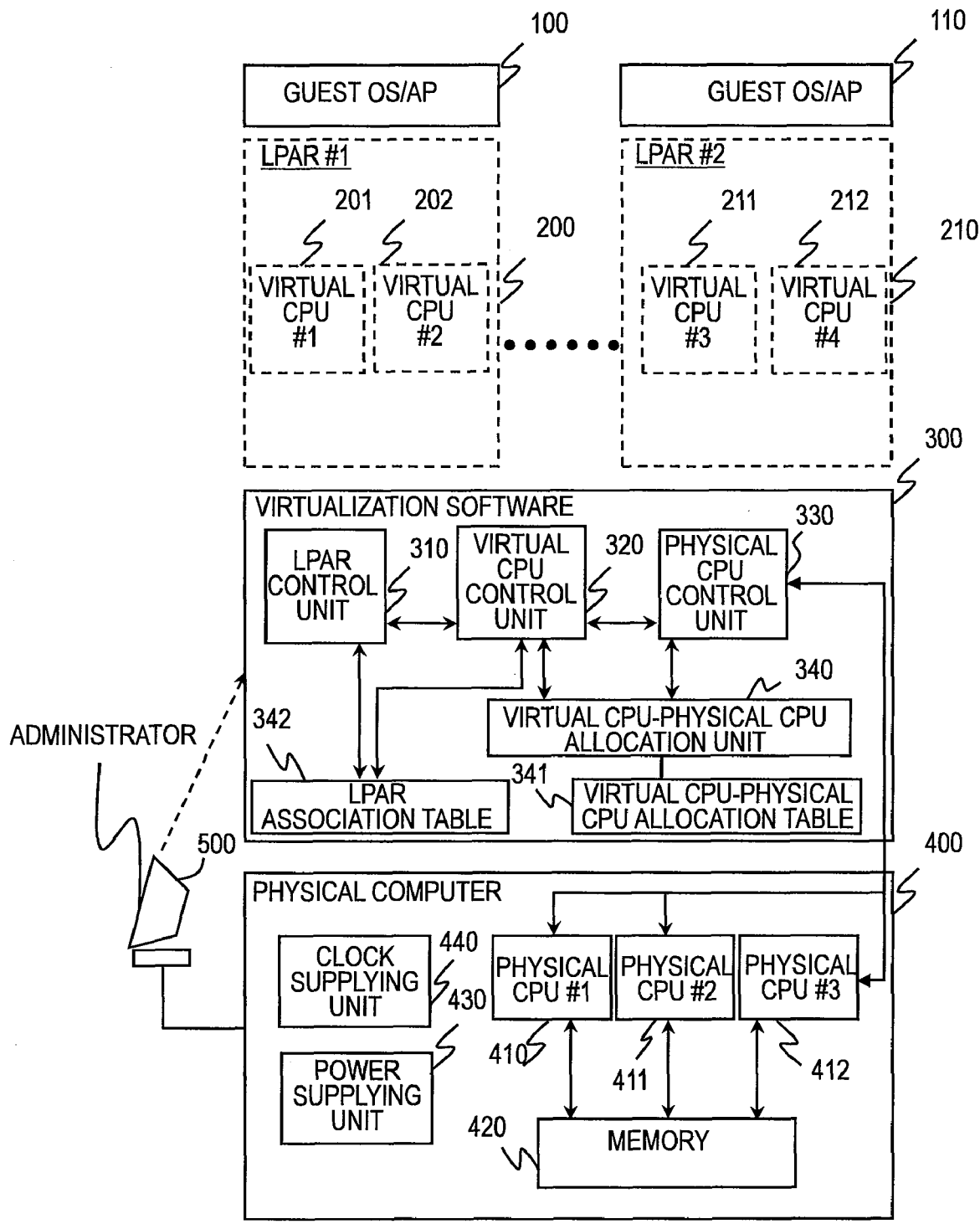
FIG. 1 is a block diagram illustrating an example of a virtual computer system to which this invention is applied as a first embodiment.

FIG. 1 is a block diagram illustrating an example of a virtual computer system to which this invention is applied as a first embodiment.

The virtual computer system has logical partitions (LPARs) 200 and 210, virtualization software 300, a physical computer 400, and a management console 500. The logical partitions 200 and 210 are allocated virtual CPUs 201, 202, 211, and 212, which execute guest OSs (or applications: APs) 100 and 110. The virtualization software 300 provides these plurality of logical partitions 200 and 210 and virtual CPUs 201, 202, 211, and 212. The physical computer 400 executes the virtualization software 300. The management console 500 is connected to the physical computer 400 to send an operation instruction to the virtualization software 300. The guest OSs 100 and 110 run in the logical partitions 200 and 210 provide a virtual server.

<Configuration of Physical Computer>

The physical computer 400 has physical CPUs 410, 411, and 412, which perform computing, a memory 420, which stores data and programs, a power supplying unit 430, which supplies electric power to the physical CPUs 410 to 412 and the memory 420, and a clock supplying unit 440, which supplies clock signals to the physical CPUs 410 to 412 and the memory 420. The physical computer 400 also has the management console 500 connected via an interface (not shown), and the management console 500 has a display and an input device. The virtualization software 300 is loaded onto the memory 420 to be executed by the physical CPUs 410 to 412.

Though not illustrated in FIG. 1, the physical computer 400 may have I/O devices such as a disk drive and a network interface.

Figure 2:
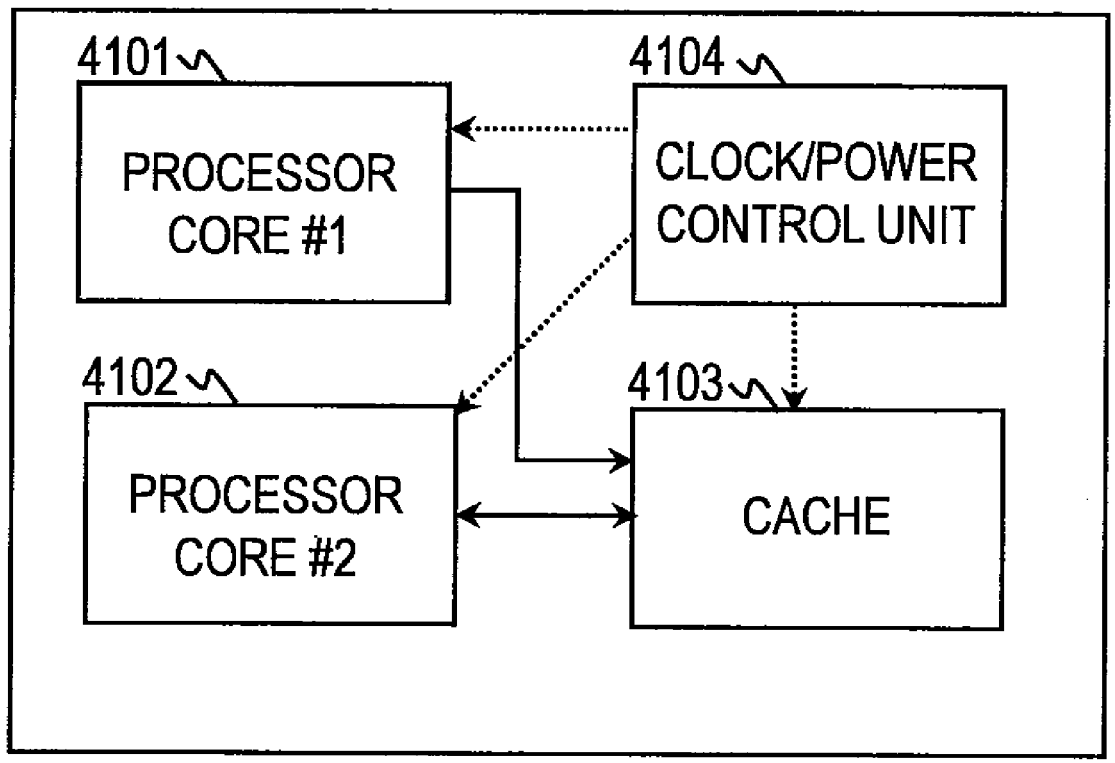
FIG. 2 is a block diagram illustrating the configuration of physical CPUs according to the first embodiment.

FIG. 2 is a block diagram illustrating the configuration of physical CPUs according to the first embodiment. The physical CPUs 410 to 412 each have a power saving mechanism capable of changing the clock frequency and the power to suit an operation instruction received from the virtualization software 300. For example, the physical CPU 410 has, as illustrated in FIG. 2, a plurality of processor cores, 4101 and 4102, a cache 4103, which temporarily stores data and commands, and a clock/power control unit 4104, which provides the processor cores 4101 and 4102 and the cache 4103 with power input from the power supplying unit 430 and clock signals input from the clock supplying unit 440. The clock/power control unit 4104 contains the power saving mechanism as will be described later. The physical CPUs 411 and 412 have the same configuration as that of the physical CPU 410 illustrated in FIG. 2.

The clock/power control unit 4104 dynamically changes the operation mode of the processor cores 4101 and 4102 by changing the level of a voltage and clock signals to be supplied to the processor cores 4101 and 4102 based on an instruction received from the virtualization software 300. Voltage/clock changes made by the clock/power control unit 4104 include an operation state in which only power and clock supply to the processor cores 4101 and 4102 is cut off while power supply to the rest of the components is continued to keep the CPU ready for reactivation. The clock/power control unit 4104 changes the voltage level and the clock frequency within a range from the rated clock and the rated voltage at which the processing performance of the processor cores 4101 and 4102 is highest when the processor cores 4101 and 4102 are operating normally to the lowest clock and the lowest voltage at which the processing performance of the processor cores 4101 and 4102 is lowest. By changing the voltage level and the clock frequency in this range, the operation state can be shifted within a range from one that gives priority to the processing performance of the physical CPU 410 to one that reduces power consumption. The clock/power control unit 4104 is capable of changing the clock frequency and the voltage level for the processor cores 4101 and 4102 separately.

The virtualization software 300 changes the operation mode of the physical CPUs 410 to 412 by setting an operation mode to the clock/power control units 4104 of the physical CPUs 410 to 412. Employable as the operation mode of the physical CPUs 410 to 412 are processor operation modes C0 to C3 which are defined by advanced configuration and power interface specification (ACPI). Specifically, the processor operation modes C0 to C3 are defined by ACPI Rev. 3.0 (http://www.acpi.info/spec30a.htm, ADVANCED CONFIGURATION AND POWER INTERFACE SPECIFICATION, Revision 3.0a, Dec. 30, 2005). The operation modes C0 to C3 of the processors (physical CPUs 410 to 412) are as follows:

C0: in operation (normal operation state)

C1: idling (sleep state), meaning a physical CPU waiting state in which operating clocks are stopped or the execution of a command is suspended by an HLT command or the like C2: consuming less power than in C1

C3: on standby (state in which power to the processor cores 4101 and 4102 is cut off while supply of power necessary for reactivation is continued)

Instead of the above modes C0 to C3 by ACPI, operation modes S0 to S3 which are defined in terms of system operation states may be employed as the operation modes of the physical CPUs 410 to 412. The operation modes S0 to S3 are as follows:

S0: in operation (normal operation state)

S1: in a sleep state where VGA signals are cut off and the physical CPU is powered down S2: cutting off power to the physical CPU (while supply of power necessary for reactivation is continued)

S3: in a standby state where a task to be executed is written in the memory, and only a current to the memory and a current necessary for reactivation are allowed to flow By sending an instruction to the clock/power control units 4104 of the physical CPUs 410 to 412, the virtualization software 300 can switch the operation mode of the physical CPUs 410 to 412 to one of three modes: a normal mode in which processing is executed at the rated operating clock frequency, a sleep mode which induces a sleep state where the execution of processing is suspended, and a low-power consumption mode in which processing is executed at a lowered operating clock frequency.

<Configuration of Virtualization Software>

The virtualization software 300 illustrated in FIG. 1 is a hypervisor or other software that does not use a host OS, and contains an LPAR control unit 310, a virtual CPU control unit 320, a physical CPU control unit 330, and a virtual CPU-physical CPU allocation unit 340. The LPAR control unit 310 divides computer resources of the physical computer 400 into a plurality of logical partitions, here, the logical partition 200 (LPAR#1) and the logical partition 210 (LPAR#2). The virtual CPU control unit 320 allocates the virtual CPUs 201, 202, 211, and 212, which are obtained by virtualizing the physical CPUs 410 to 412, to the logical partitions 200 and 210. The physical CPU control unit 330 controls the physical CPUs 410 to 412. The virtual CPU-physical CPU allocation unit 340 manages which virtual CPU is allocated to which physical CPU. The virtualization software 300 is loaded onto the memory 420 and executed by the physical CPUs 410 to 412. The virtualization software 300 is stored in a storage medium (not shown) such as a disk drive or a non-volatile memory.

The LPAR control unit 310 creates the logical partitions 200 and 210 and deletes a no longer needed logical partition upon operation instruction from the management console 500, which is operated by a system administrator or the like. The LPAR control unit 310 allocates computer resources of the physical computer 400 to the logical partitions as instructed by an operation instruction from the management console 500. Through the management console 500, the system administrator or the like sets for each of the logical partitions 200 and 210 an allocated amount of the memory 420 (measured by address range, for example) and which virtual CPU and I/O device is to be allocated as computer resources. The LPAR control unit 310 can employ a known method in allocating the computer resources of the physical computer 400.

The LPAR control unit 310 allocates virtual CPUs to the created logical partitions 200 and 210 in order to run the guest OSs 100 and 110 in the logical partitions 200 and 210 separately and run applications (APs) on the guest OSs 100 and 110 separately.

The virtual CPU control unit 320 creates and deletes a virtual CPU (corresponding to creation and deletion of logical partition) requested by the LPAR control unit 310, and manages the operation states of virtual CPUs. For this purpose, the virtual CPU control unit 320 has a logical partition association table 342, which holds the association relation between the logical partitions 200 and 210 and the virtual CPUs 201 to 212.

The virtual CPU control unit 320 receives a request to create a virtual CPU from the LPAR control unit 310 and, after determining which physical CPU is to be allocated the requested virtual CPU, instructs the virtual CPU-physical CPU allocation unit 340 to create the virtual CPU. Notified by the virtual CPU-physical CPU allocation unit 340 that the creation of the virtual CPU has been completed, the virtual CPU control unit 320 updates information in the logical partition association table 342 about a logical partition to which the virtual CPU is allocated.

The virtual CPU control unit 320 receives a request to delete a virtual CPU from the LPAR control unit 310 and instructs the virtual CPU-physical CPU allocation unit 340 to erase the association relation between the virtual CPU requested to be deleted and a physical CPU to which the requested virtual CPU has been allocated. In the case where deleting the requested virtual CPU leaves no virtual CPUs allocated to this physical CPU, the virtual CPU-physical CPU allocation unit 340 instructs the physical CPU control unit 330 to switch the operation mode of this physical CPU to a power saving mode. The virtual CPU control unit 320 then erases the deleted virtual CPU from the logical partition association table 342. Physical CPU operation modes including the power saving mode will be described later.

The virtual CPU control unit 320 also monitors the operation states (allocation states) of the virtual CPUs 201, 202, 211, 212 allocated to the logical partitions 200 and 210 to update the logical partition association table 342 and to notify the virtual CPU-physical CPU allocation unit 340 of the collected operation states.

The physical CPU control unit 330 monitors the operation states (operation modes) of the physical CPUs 410 to 412 and, upon request from the virtual CPU-physical CPU allocation unit 340, controls the operation modes of the physical CPUs 410 to 412. When a physical CPU to which no virtual CPU is allocated is found among the physical CPUs 410 to 412, the physical CPU control unit 330 switches the operation mode of this physical CPU to the power saving mode. When the virtual CPU-physical CPU allocation unit 340 is to allocate a new virtual CPU to one of the physical CPUs 410 to 412 and this physical CPU is in the power saving mode, the physical CPU control unit 330 switches the operation mode of this physical CPU to put the physical CPU into operation.

The virtual CPU-physical CPU allocation unit 340 dynamically manages the allocation of virtual CPUs to the physical CPUs 410 to 412 upon request from the virtual CPU control unit 320. For this purpose, the virtual CPU-physical CPU allocation unit 340 has a virtual CPU-physical CPU allocation table 341 in which the association relation between the virtual CPUs 201, 202, 211, and 212 and the physical CPUs 410 to 412 is set.

The virtual CPU-physical CPU allocation unit 340 obtains the operation states of virtual CPUs from the virtual CPU control unit 320, obtains the operation states of the physical CPUs 410 to 412 from the physical CPU control unit 330, and dynamically changes the allocation of virtual CPUs to the physical CPUs 410 to 412 upon request from the virtual CPU control unit 320 to deal with a change in operation state of a virtual CPU. For this purpose, the virtual CPU-physical CPU allocation unit 340 uses the virtual CPU-physical CPU allocation table 341 in which virtual CPUs allocated to the physical CPUs 410 to 412 are managed.

The first embodiment illustrates an example in which the virtual CPU-physical CPU allocation unit 340 dynamically changes the operation modes of the physical CPUs 410 to 412 by dynamically changing the allocation of virtual CPUs to the physical CPUs 410 to 412 based on a request from the virtual CPU control unit 320 and the allocation ratios of the virtual CPUs 201, 202, 211, and 212.

<Allocation of Virtual CPUs>

Virtual CPU allocation performed by the virtualization software 300 will be described next. The virtualization software 300 uses two different methods, exclusive allocation and shared allocation, in allocating computer resources of the physical computer 400 to the logical partitions 200 and 210.

The exclusive allocation is a method in which a specific computer resource is allocated exclusively to a specific logical partition. Among computer resources, the memory 420 (main memory) and I/O devices are allocated by the shared allocation.

The physical CPUs 410 to 412 may be allocated by the exclusive allocation. In the case where the physical CPUs 410 to 412 are allocated by the exclusive allocation, the number of physical CPUs selected out of the physical CPUs 410 to 412 to be allocated exclusively to one logical partition is called an allocated CPU amount of this LPAR.

The shared allocation is a method in which a computer resource is allocated in small amounts to the logical partitions in a time-sharing manner. In the shared allocation, the ratio of the length of time in which one of the physical CPUs 410 to 412 is allocated to a virtual CPU of one logical partition to the total length of time in which the physical CPU is allocated to any LPAR is called an allocation ratio of the virtual CPU (virtual CPU allocation ratio is expressed in % and takes a value between 0 and 100).

FIG. 3 is an explanatory diagram illustrating an example of a virtual CPU-physical CPU allocation table that is managed by virtualization software according to the first embodiment. As illustrated in FIG. 3, the virtual CPU-physical CPU allocation table 341 managed by the virtual CPU-physical CPU allocation unit 340 of the virtualization software 300 holds the identifiers and allocation ratios of respective virtual CPUs allocated to the physical CPUs 410 to 412.

Each entry of the virtual CPU-physical CPU allocation table 341 of FIG. 3 is constituted of a physical CPU number 3410, an operation state 3411, and a virtual CPU list. The identifier of one of the physical CPUs 410 to 412 is stored as the physical CPU number 3410. The operation state of a physical CPU that is identified by the physical CPU number 3410 is stored as the operation state 3411. The virtual CPU list holds information of a plurality of virtual CPUs. The virtual CPU list is constituted of a virtual CPU number 3412, which indicates the identifier of a virtual CPU allocated to the physical CPU that is identified by the physical CPU number 3410, and an allocation ratio 3413, which indicates the allocation ratio of a virtual CPU that is identified by the virtual CPU number 3412. As the virtual CPU number 3412 and the allocation ratio 341, as many identifiers and allocation ratios as the number of relevant virtual CPUs are stored.

In the example of FIG. 3, an entry whose physical CPU number 3410 is 1 illustrates that the operation state 3411 of the physical CPU is the normal operation state (for example, operating at the rated clock frequency and the rated supply voltage), and that the physical CPU is allocated a virtual CPU having a virtual CPU number "1" at an allocation ratio of 40%, and a virtual CPU having a virtual CPU number "3" at an allocation ratio of 20%. This means that the physical CPU having the physical CPU number "1" can be allocated more virtual CPUs at an allocation ratio of 40%, which is the remainder of subtracting 40% and 20% from 100%. The virtual CPU list holds as many pairs of virtual CPU number 3412 and allocation ratio 3413 as the number of virtual CPUs allocated to a virtual CPU that has the physical CPU number 3410 in question.

The physical CPUs 410 to 412 of FIG. 1 correspond to physical CPU numbers 1 to 3 of FIG. 3, respectively, and the virtual CPUs 201, 202, 211, and 212 of FIG. 1 correspond to virtual CPU numbers 1, 2, 3, and 4 of FIG. 3, respectively.

In the first embodiment, the operation state 3411 of a physical CPU is set to one of "normal" and "sleep". "Normal" indicates that the physical CPU is operating at the rated frequency and voltage. "Sleep" indicates a low-power consumption state, which can be C1 or higher (C1 to C3) or S1 or higher (S1 to S3) defined by ACPI as described above. Also in the following description, a sleep state refers to the above-mentioned processor operation modes C1 to C3 (or S1 to S3) of ACPI.

FIG. 4 is an explanatory diagram illustrating an example of a logical partition association table that is managed by virtualization software according to the first embodiment. The logical partition association table 342 managed by the virtual CPU control unit 320 is structured as illustrated in FIG. 4. Each entry of the logical partition association table 342 of FIG. 4 is constituted of a logical partition number 3420 and a virtual CPU list. The identifier of a logical partition is stored as the logical partition number 3420. The virtual CPU list holds the identifier of a virtual CPU allocated to a logical partition that is identified by the logical partition number 3420. The virtual CPU list is constituted of a virtual CPU number 3421, which indicates the identifier of a virtual CPU allocated to a logical partition that is identified by the logical partition number 3420. In the case where a plurality of virtual CPUs are allocated to a single logical partition, a plurality of identifiers are set as the virtual CPU number 3421. In the example of FIG. 4, the logical partition 201 whose logical partition number 3420 is 1 is allocated two virtual CPUs, #1 and #2, while the logical partition 210 whose logical partition number 3420 is 2 is allocated two virtual CPUs, #3 and #4.

<Operation of the Virtualization Software>

Figure 5:
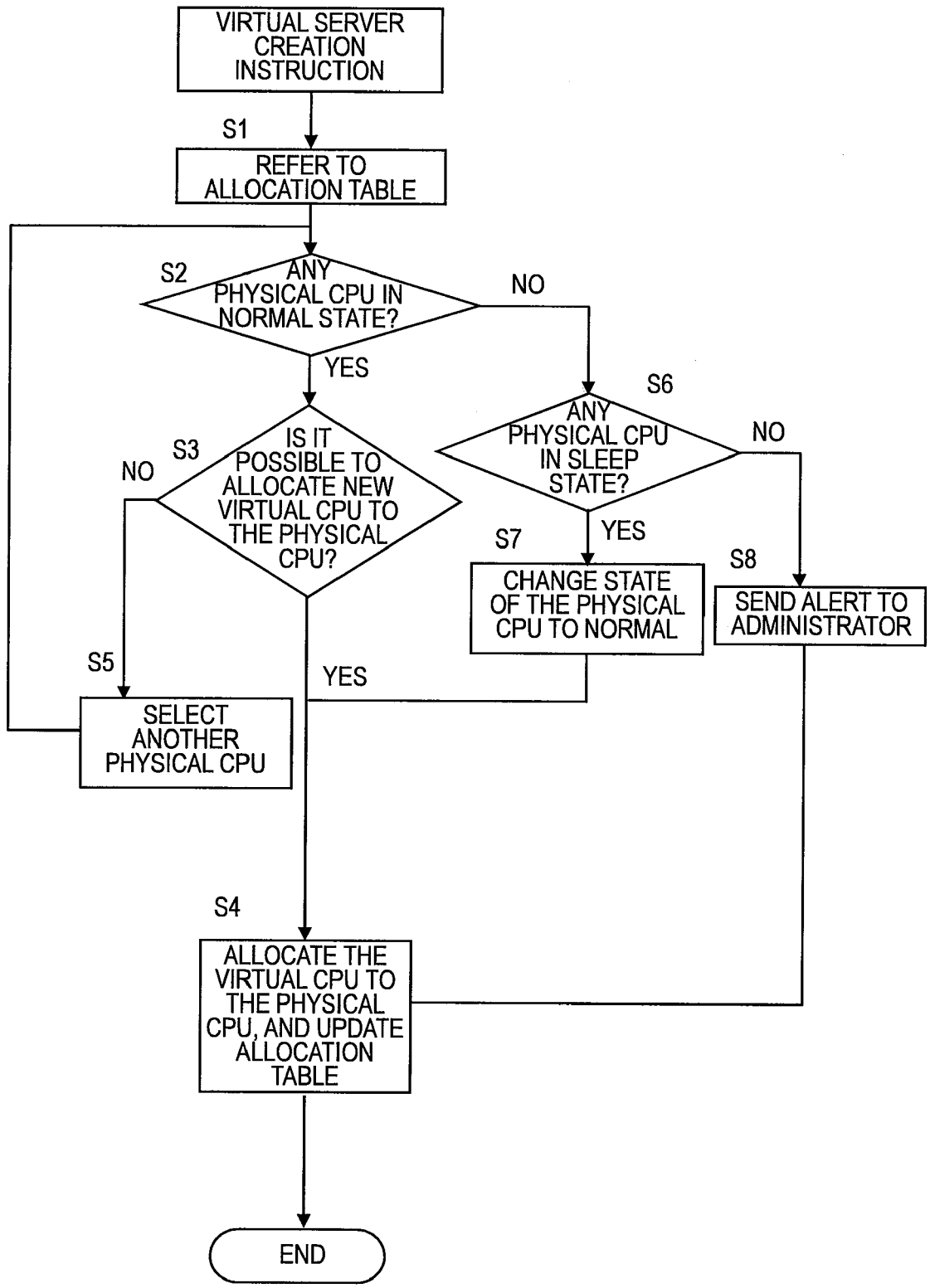
FIG. 5 is a flow chart illustrating an example of virtual server (or virtual CPU) creating processing that is executed by the virtualization software according to the first embodiment.

Next, an example of processing that is executed by the virtualization software 300 is described below. FIG. 5 is a flow chart illustrating an example of virtual server (or virtual CPU) creating processing that is executed by the virtualization software 300 according to the first embodiment. This flow chart is of processing executed when the virtualization software 300 receives an operation instruction from the management console 500 to create a virtual server (or virtual CPU) in specified one of the logical partitions 200 and 210. The premise here is that, before executing this processing, the virtualization software 300 has already set the logical partitions 200 and 210 in response to an operation instruction from the management console 500.

The virtualization software 300 receives from the management console 500 a logical partition in which a virtual server (or virtual CPU) is to be created and the count and allocation ratios of virtual CPUs. In Step S1, the virtualization software 300 refers to the virtual CPU-physical CPU allocation table 341 to find out which one of the physical CPUs 410 to 412 is in an operation state in which a virtual CPU can be executed. In Step S2, the virtualization software 300 judges whether or not the physical CPUs 410 to 412 include a physical CPU whose operation state 3411 is found to be "normal" in Step S1. The virtualization software 300 proceeds to Step S3 when there is at least one physical CPU whose operation state 3411 is "normal", and to Step S6 when there is not.

Next, in Step S3, the virtualization software 300 judges whether or not any of the physical CPUs whose operation state 3411 is "normal" can be allocated the virtual CPU requested by the management console 500. The allocation of the virtual CPU requested by the management console 500 to a physical CPU is judged as executable when a value determined by subtracting the sum of the allocation ratios of virtual CPUs that are allocated to the physical CPU from 100% is equal to or larger than the allocation ratio of the virtual CPU requested to be created. Then, the virtualization software 300 proceeds to Step S4. When a value determined by subtracting the sum of the allocation ratios of virtual CPUs that are allocated to the physical CPU from 100% is smaller than the allocation ratio of the virtual CPU requested to be created, the virtualization software 300 judges that the virtual CPU requested by the management console 500 cannot be allocated to this physical CPU and proceeds to Step S5. In Step S5, another physical CPU is selected as a candidate for the physical CPU to which the requested virtual CPU is to be allocated. The virtualization software 300 then returns to Step S2, in which the search for a physical CPU that can be allocated a virtual CPU is conducted again. The loop from Step S5 to Step S2 is executed for one entry of the virtual CPU-physical CPU allocation table 341 at a time.

In Step S4, the logical partition specified to be allocated to the virtual CPU that is requested by the management console 500 is allocated to the physical CPU selected in Step S3, and the identifier of the requested virtual CPU is written in association with the specified logical partition in the logical partition association table 342. The virtualization software 300 then updates the virtual CPU-physical CPU allocation table 341 by writing the virtual CPU number and allocation ratio of the newly allocated virtual CPU in an entry of the selected physical CPU, and subsequently activates the new virtual CPU.

In Step S6, which is reached when Step S2 finds no physical CPU whose operation state 3411 is "normal" and that can be allocated a new virtual CPU, the virtual CPU-physical CPU allocation table 341 is searched for a physical CPU whose operation state 3411 is "sleep". When there is a physical CPU whose operation state 3411 is "sleep", the virtualization software 300 proceeds to Step S7, in which this physical CPU is activated after changing the operation state 3411 of this physical CPU "normal". The virtualization software 300 selects the activated physical CPU as the physical CPU to which the requested virtual CPU is to be allocated and proceeds to Step S4, in which the allocation is executed in the manner described above.

When Step S6 finds no physical CPU whose operation state 3411 is "sleep", it means that there is no physical CPU to allocate a virtual CPU to. The virtualization software 300 therefore alerts the management console 500 to a shortage of computer resources for allocating new virtual CPUs.

In the above-mentioned processing, receiving a request from the management console 500 to create a new virtual CPU, the virtualization software 300 first searches for an allocation destination among operating physical CPUs whose operation state 3411 is "normal" and, only when it is not possible to allocate the virtual CPU to any of the operating physical CPUs, activates a physical CPU whose operation state 3411 is "sleep" to allocate the new virtual CPU to the activated physical CPU. Only minimum physical CPUs necessary to allocate the virtual CPU are thus allowed to operate in the "normal" operation state 3411 while reactivating a physical CPU whose operation state 3411 is "sleep" is avoided as long as possible. An increase in power consumption of the physical computer 400 can be prevented in this manner.

Figure 6:
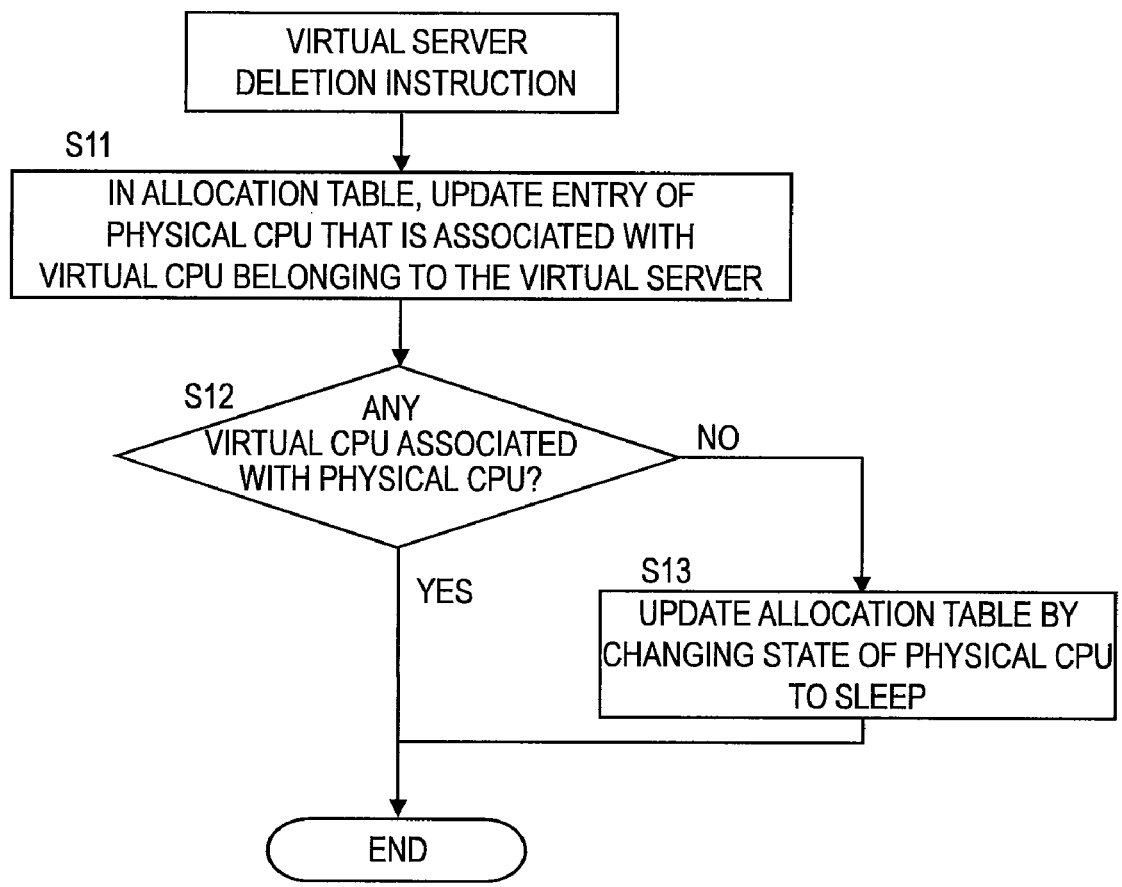
FIG. 6 is a flow chart illustrating an example of processing that is executed when the virtualization software receives from the management console an operation instruction to delete a specified virtual server (or virtual CPU) according to the first embodiment.

FIG. 6 is a flow chart illustrating an example of processing that is executed when the virtualization software 300 receives from the management console 500 an operation instruction to delete a specified virtual server (or virtual CPU) according to the first embodiment.

The virtualization software 300 receives the identifier of a virtual server (or virtual CPU) to be deleted from the management console 500. In Step S11, the virtualization software 300 refers to the virtual CPU-physical CPU allocation table 341 to erase the identifier and allocation ratio of the specified virtual CPU from an entry of a physical CPU that is running this virtual CPU. The virtualization software 300 also refers to the logical partition association table 342 and, if the table contains the identifier of the virtual CPU specified by the management console 500, erases the identifier.

In Step S12, the virtualization software 300 judges whether or not an allocated virtual CPU is held in the entry of the physical CPU from which the identifier and allocation ratio of the specified virtual CPU have been erased in Step 11. The virtualization software 300 ends the processing when the entry has an allocated virtual CPU, and proceeds to Step S13 when no virtual CPU is allocated to this physical CPU.

In Step S13, the virtualization software 300 instructs the physical CPU control unit 330 to change the operation state of the physical CPU that has been allocated the virtual CPU whose identifier has been erased in Step S11 to a sleep state, and then ends the processing.

Through the above-mentioned processing, a physical CPU to which no virtual CPUs remain allocated as a result of deleting a requested virtual CPU is put into a sleep state, thereby reducing the power consumption of the physical computer 400.

As described above, according to the first embodiment of this invention, the overall power consumption of a virtual computer system in which servers are virtualized can be reduced by controlling the virtual CPU-physical CPU association and shifting a physical CPU to which no virtual CPUs are allocated to a sleep state.

While the first embodiment illustrates an example of allocating virtual CPUs to the multicore physical CPUs 410 to 412 by allocating virtual CPUs on a physical CPU basis, virtual CPU allocation may be performed on a processor core basis.

Second Embodiment

Figure 8:
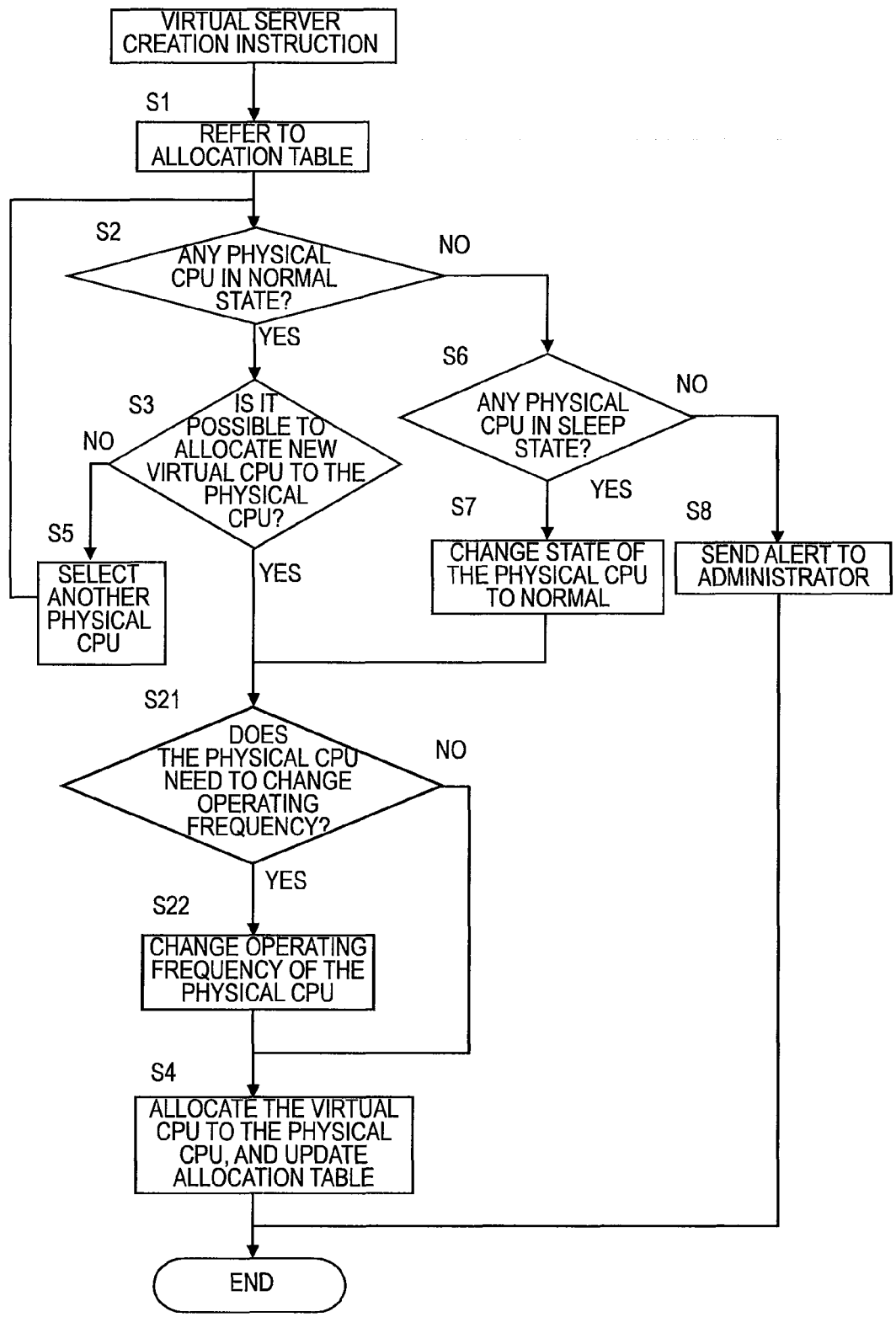
FIG. 8 is a flow chart illustrating an example of virtual server (or virtual CPU) creating processing that is executed by the virtualization software according to the second embodiment.
Figure 9:
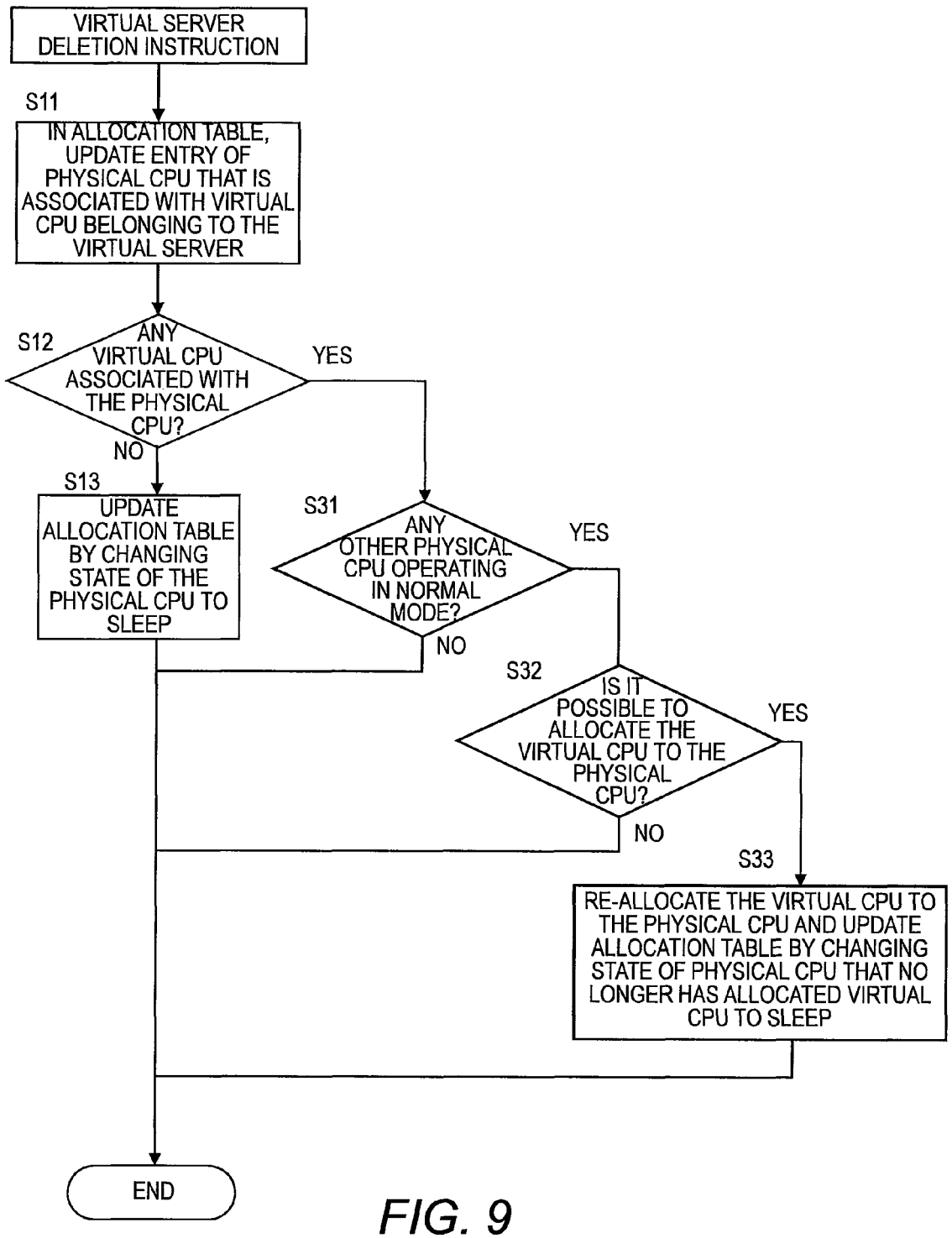
FIG. 9 is a flow chart illustrating an example of processing that is executed when the virtualization software receives from the management console an operation instruction to delete a specified virtual server (or virtual CPU) according to the second embodiment.

FIGS. 7 to 9 illustrate a second embodiment of this invention in which the physical CPU control unit 330 of the first embodiment controls the operating clock of the physical CPUs 410 to 412, and the virtual CPU-physical CPU allocation unit 340 controls virtual CPU allocation in a manner that maximizes the number of physical CPUs in a sleep state when a virtual CPU is deleted. The configuration of the physical computer 400 in the second embodiment is the same as in the first embodiment. In the virtualization software 300 of the second embodiment, some of functions of the virtual CPU-physical CPU allocation unit 340 and the physical CPU control unit 330 differ from the first embodiment, and a virtual CPU-physical CPU allocation table 341A is structured in some parts differently from the virtual CPU-physical CPU allocation table 341 of the first embodiment.

FIG. 7 is an explanatory diagram illustrating the configuration of the virtual CPU-physical CPU allocation table 341A which is managed by the virtual CPU-physical CPU allocation unit 340 according to the second embodiment. The virtual CPU-physical CPU allocation table 341A of the second embodiment is obtained by adding an operating frequency 3414, which indicates the frequency of the operating clock of the physical CPUs 410 to 412, to the virtual CPU-physical CPU allocation table 341 of the first embodiment illustrated in FIG. 3. The rest of the virtual CPU-physical CPU allocation table 341A is the same as in the first embodiment. The operating frequency 3414 is a value expressed in percentage to indicate the ratio of an operating clock frequency that is actually set to a clock frequency of the physical CPUs 410 to 412 operating under the rated operating conditions.

The physical CPUs 410 to 412 each have the clock/power control unit 4104, which controls clock signals supplied from the clock supplying unit 440, as described in the first embodiment with reference to FIG. 2. This configuration enables the physical CPUs 410 to 412 to change the operating clock frequency. The physical CPUs 410 to 412 accomplish a change in operating clock frequency by changing a frequency value that is specified by the virtual CPU-physical CPU allocation unit 340 and sent to the clock/power control units 4104 of the physical CPUs 410 to 412.

In the case where the operating clock frequency is controlled separately for the processor cores 4101 and 4102 of FIG. 2, the virtual CPU-physical CPU allocation table 341A may have an entry for each processor core of the physical CPUs 410 to 412 instead of an entry for each of the physical CPUs 410 to 412.

In allocating a virtual CPU to one of the physical CPUs 410 to 412, the virtual CPU-physical CPU allocation unit 340 sets an operating clock frequency fit to the allocation ratio of the virtual CPU, and sends the operating clock frequency to the physical CPU control unit 330. As an operating clock frequency suitable for the allocation ratio of a virtual CPU to be allocated to one of the physical CPUs 410 to 412, the sum of allocation ratios of virtual CPUs that are allocated to this physical CPU, for example, may be set as the operating frequency 3414. Specifically, in the example of FIG. 7, the operating frequency 3414 of the physical CPU #1 is set to 60% by extracting, from an entry that holds "1" as the physical CPU number 3410, the allocation ratio 3413 of the virtual CPU #1 which is 40% and the allocation ratio 3413 of the virtual CPU #3 which is 20%, and then calculating the sum of the allocation ratios 3413. A condition for changing the operating clock frequency of one of the physical CPUs 410 to 412 is set such that a change in operating clock frequency is allowed when the sum of the allocation ratios 3413 of virtual CPUs that are allocated to this physical CPU is smaller than a given first threshold (e.g., 90%). The first threshold can be a value suited to the characteristics of the guest OSs 100 and 110 and applications, for example.

As described later, when a virtual CPU is deleted, the virtual CPU-physical CPU allocation unit 340 changes the allocation of virtual CPUs to maximize the number of physical CPUs that are in a sleep state among the physical CPUs 410 to 412, thereby optimizing virtual CPU allocation and minimizing the power consumption of the physical computer 400.

FIG. 8 is a flow chart illustrating an example of virtual server (or virtual CPU) creating processing that is executed by the virtualization software 300 according to the second embodiment. This flow chart is similar to FIG. 5 described in the first embodiment and illustrates processing executed when the virtualization software 300 receives from the management console 500 an operation instruction to create a virtual server (or virtual CPU) in specified one of the logical partitions 200 and 210. The premise here is that, before executing this processing, the virtualization software 300 has already set the logical partitions 200 and 210 in response to an operation instruction from the management console 500. Steps common to FIG. 8 and FIG. 5 described in the first embodiment are denoted by the same reference symbols.

The processing of the second embodiment illustrated in FIG. 8 is obtained by inserting additional steps, Steps S21 and S22, between the Steps S3 and S4 of FIG. 5 described in the first embodiment. Steps S21 and S22 are steps of changing the operating clock frequency of the physical CPUs 410 to 412, and the rest of FIG. 8 is the same as FIG. 5.

Receiving a request from the management console 500 to create a new virtual CPU, the virtualization software 300 first searches the virtual CPU-physical CPU allocation table 341A in Steps S1 to S3 for an allocation destination among physical CPUs that are operating in the "normal" operation state 3411. Only when it is not possible to allocate the virtual CPU to any of the operating physical CPUs, the virtualization software 300 activates a physical CPU whose operation state 3411 is "sleep" and allocates the new virtual CPU to the activated physical CPU in Steps S6 and S7. The virtualization software 300 issues an alert in Step S8 when there are no physical CPUs that are in a sleep state.

After which of the physical CPUs 410 to 412 is to be allocated the specified virtual CPU is determined in Step S3 or S7, the virtualization software 300 proceeds to Step S21 to judge whether to change the operating clock frequency of this physical CPU 410, 411, or 412. Specifically, the virtualization software 300 refers to the virtual CPU-physical CPU allocation table 341A to judge whether or not the sum of a value determined by combining the allocation ratios 3413 of virtual CPUs that are already allocated to the selected physical CPU and the allocation of the new virtual CPU specified by the management console 500 is smaller than the given first threshold (e.g., 90%). When the sum is smaller than the first threshold, the virtualization software 300 judges that the operating clock frequency of the selected physical CPU 410, 411, or 412 is to be changed, and proceeds to Step S22. When the sum is equal to or larger than the first threshold, the virtualization software 300 judges that the operating clock frequency of the selected physical CPU 410, 411, or 412 does not need to be changed, and moves to Step S4.

In Step S22, a value determined by combining the allocation ratios of virtual CPUs allocated to the selected physical CPU is set as the ratio of the operating clock frequency of this physical CPU with respect to the rated clock frequency in the manner described above. The virtualization software 300 then instructs the physical CPU to change its operating clock frequency to one that satisfies this frequency ratio. In this way, when a new virtual CPU is allocated to a physical CPU, the operating clock frequency of the physical CPU can be raised to match an increase in total allocation ratio, thereby enabling the physical CPU to operate while consuming minimum power necessary to execute virtual CPUs and reducing the power consumption of the physical computer 400 accordingly.

In Step S4, the virtual CPU-physical CPU allocation table 341A is updated by writing the identifier and allocation ratio of the newly allocated virtual CPU as the virtual CPU number 3412 and the allocation ratio 3413 and storing the ratio of the operating clock frequency set in S22 as the operating frequency 3414 in an entry of the physical CPU selected in Step S3 or S7. The virtualization software 300 then ends the processing.

Through the above-mentioned processing, a virtual CPU is created while changing the operating clock frequencies of the physical CPUs 410 to 412 to suit, for example, the allocation ratios of respective virtual CPUs allocated to the physical CPUs 410 to 412. As a result, the power consumption of the physical computer 400 can be further reduced.

FIG. 9 is a flow chart illustrating an example of processing that is executed when the virtualization software 300 receives from the management console 500 an operation instruction to delete a specified virtual server (or virtual CPU) according to the second embodiment. This processing is obtained by adding Steps S31 to S33 to the flow chart of FIG. 6 described in the first embodiment, and Steps S11 to S13 of FIG. 9 are the same as Steps S11 to S13 of FIG. 6 described in the first embodiment.

In Steps S11 to S13, a physical CPU to which no virtual CPUs remain allocated as a result of deleting a requested virtual CPU is put into a sleep state in the manner described in the first embodiment with reference to FIG. 6, thereby reducing the power consumption of the physical computer 400.

In the case where Step S12 finds that other virtual CPUs are allocated to the physical CPU that has been allocated the virtual CPU specified by the management console 500 to be deleted, the virtualization software 300 proceeds to Step S31.

In Step S31, the virtual CPU-physical CPU allocation table 341A is referred to in order to judge whether or not any other physical CPU is operating in the "normal" operation state 3411. The virtualization software 300 proceeds to Step S32 when there is another physical CPU operating in a normal state, and ends the processing without performing further processing when the physical CPUs 410 to 412 do not include any other physical CPU that is operating in a normal state. "Normal" as a value of the operation state 3411, which, in the first embodiment, indicates a state where the physical CPUs 410 to 412 are operating under the rated operating conditions, includes a state in which the physical CPUs 410 to 412 are executing virtual CPUs at changed operating clock frequencies in the second embodiment.

In Step S32, the virtual CPU-physical CPU allocation table 341A is referred to in order to judge whether or not there is a physical CPU that can be allocated all of the virtual CPUs remaining allocated to the currently selected physical CPU which has been allocated the deleted virtual CPU. Specifically, the virtualization software 300 searches for a physical CPU that are allocated virtual CPUs whose allocation ratios combined are such that the result of adding this combined allocation ratio to the total allocation ratio of all virtual CPUs remaining allocated to the physical CPU that has been allocated the deleted virtual CPU is 100% or less. When such physical CPU is found, the virtualization software 300 selects this physical CPU as a place in which the remaining virtual CPUs are to be reallocated, and proceeds to Step S33. When the result of the above-mentioned addition exceeds 100%, on the other hand, the remaining virtual CPUs cannot be reallocated and the processing is ended at this point.

In Step S33, the remaining virtual CPUs of the physical CPU that has been allocated the deleted virtual CPU are reallocated to the physical CPU selected in Step S32, and the virtual CPU-physical CPU allocation table 341A is updated accordingly. The virtual CPU-physical CPU allocation table 341A is again updated after setting the physical CPU that no longer has allocated virtual CPUs as a result of the virtual CPU reallocation to a sleep state. The processing is then ended.

The above-mentioned processing not only shifts a physical CPU to which no virtual CPUs remain allocated as a result of deleting a requested virtual CPU into a sleep state but also reallocates virtual CPUs remaining allocated to the physical CPU that has been allocated the deleted virtual CPU to another physical CPU if the reallocation is executable. Thereafter, the physical CPU that no longer has allocated virtual CPUs as a result of the reallocation shifts to a sleep state. In this way, only minimum physical CPUs necessary to execute virtual CPUs throughout the physical computer 400 are allowed to operate in a normal state while the rest of the physical CPUs are shifted to a sleep state. The number of physical CPUs that are in a sleep state is thus maximized and virtual CPU allocation can be optimized in a manner that greatly reduces the power consumption of the physical computer 400.

Figure 10:
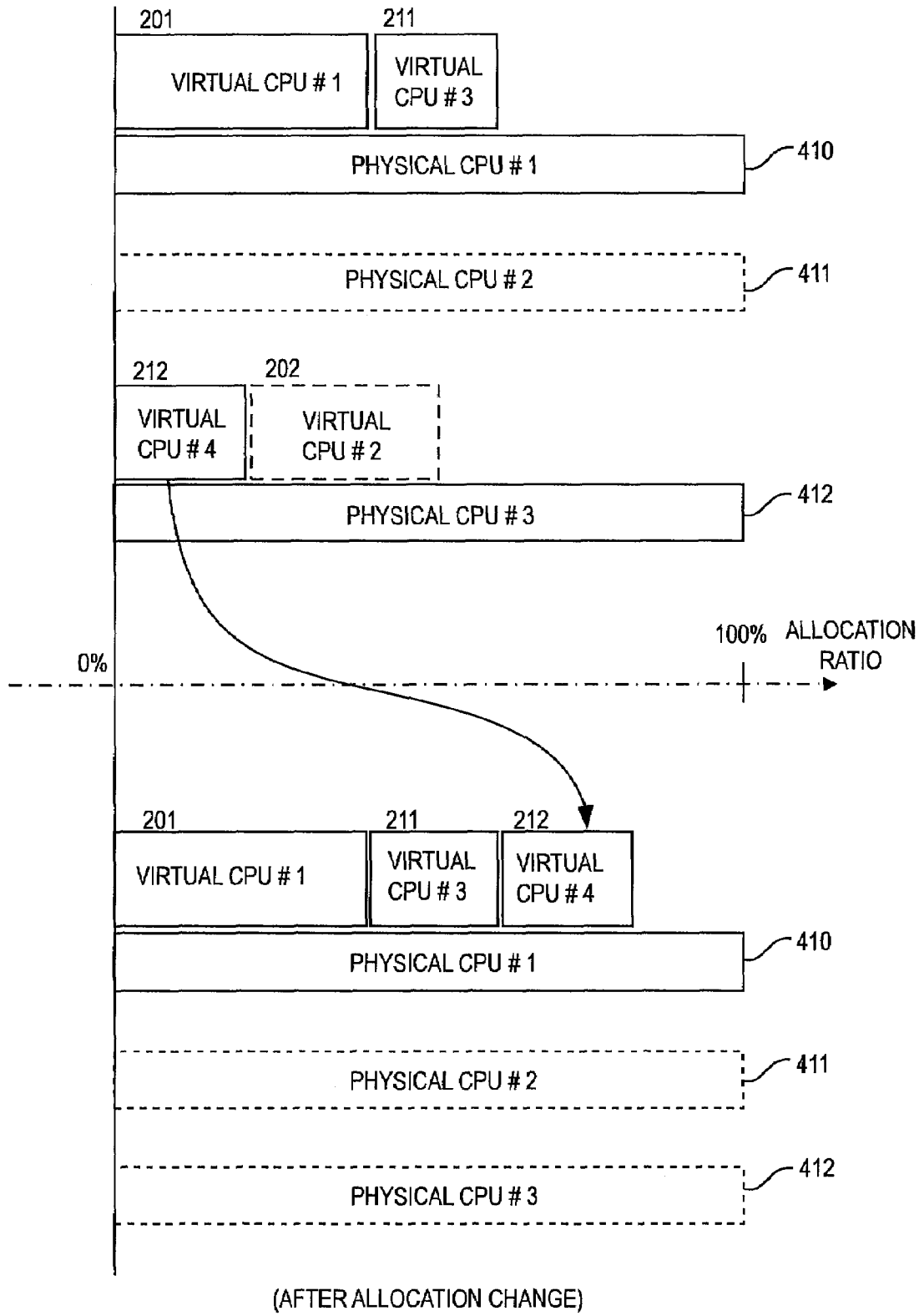
FIG. 10 is an explanatory diagram illustrating how a virtual CPU is reallocated through virtual CPU deleting processing according to the second embodiment.

For example, the virtual CPU-physical CPU allocation table 341A illustrated in FIG. 7 cab be expressed in allocation ratios of physical CPUs and virtual CPUs as illustrated in FIG. 10. FIG. 10 is an explanatory diagram illustrating how a virtual CPU is reallocated through virtual CPU deleting processing according to the second embodiment. The upper half of FIG. 10 illustrates the allocation before an allocation change and the lower half of FIG. 10 illustrates the allocation after the allocation change.

FIG. 10 illustrates a case in which the virtual CPU #4 (212) allocated to the physical CPU #3 (412) is to be deleted, and the upper half of FIG. 10 illustrates a pre-deletion state and the lower half illustrates a post-deletion state.

The allocation ratios of the virtual CPUs #1 and #3 allocated to the physical CPU #1 are 40% and 20%, respectively. The allocation ratios of the virtual CPUs #4 and #2 allocated to the physical CPU #3 are 20% and 40%, respectively. The physical CPU #2 is in a sleep state.

Deleting the virtual CPU #2 of the physical CPU #3 here leaves only the virtual CPU #4 whose allocation ratio is 20% to the physical CPU #3. The virtual CPU-physical CPU allocation table 341A is searched for a physical CPU that can be allocated the virtual CPU #4 whose allocation ratio is 20%. A value determined by adding the allocation ratio of the virtual CPU #4, 20%, to the total allocation ratio of the virtual CPUs allocated to the physical CPU #1, 60%, is 80%, which is less than the given threshold 90%. The virtual CPU #4 can therefore be reallocated to the physical CPU #1. This embodiment uses a threshold for changing the operating clock frequency as a threshold for judging whether or not the sum of virtual CPU allocation ratios 3413 is too large, but those two thresholds may be set independently of each other.

The virtualization software 300 reallocates the virtual CPU #4 of the physical CPU #3 to the physical CPU #1, and then puts the physical CPU #3 to which no virtual CPUs remain allocated into a sleep state.

As described above, when a virtual CPU is deleted, physical CPUs are sequentially checked to search for physical CPU that is operating in a normal state and that is allocated virtual CPUs whose allocation ratios combined are such that the result of adding this combined allocation ratio to the total allocation ratio of virtual CPUs left to the physical CPU that has been allocated the deleted virtual CPU is smaller than a given threshold. When the sum of the virtual CPU allocation ratios of two physical CPUs is smaller than a given threshold, virtual CPUs that have been allocated to one of the physical CPUs are reallocated to the other physical CPU. A physical CPU to which no virtual CPUs are allocated is thus created and is put into a sleep state, and hence the power consumption of the physical computer 400 can be reduced.

Further, when there is a change in allocation of virtual CPUs to physical CPUs, the operating clock frequency of a physical CPU is raised or lowered according to the sum of the allocation ratios of virtual CPUs that are allocated to the physical CPU. The power consumption of the physical computer 400 can therefore be minimized.

The second embodiment illustrates an example in which the virtualization software 300 changes allocation of virtual CPUs to physical CPUs upon reception of virtual CPU deletion instruction, but Steps S12 to S33 of FIG. 9 may be executed when a virtual CPU is created or in the course of monitoring the virtual CPU allocation of each physical CPU at regular intervals.

While it is the operating clock frequency of the physical CPUs 410 to 412 that is changed in the example described above, the clock/power control units 4104 of the physical CPUs 410 to 412 may be instructed to change the voltage. For example, when the operating clock frequency is to be lowered, the clock/power control units 4104 may be instructed to lower a voltage to be supplied to the processor cores 4101 and 4102 as well. The operating clock frequency and the supply voltage can be changed by well-known methods.

Third Embodiment

Figure 11:
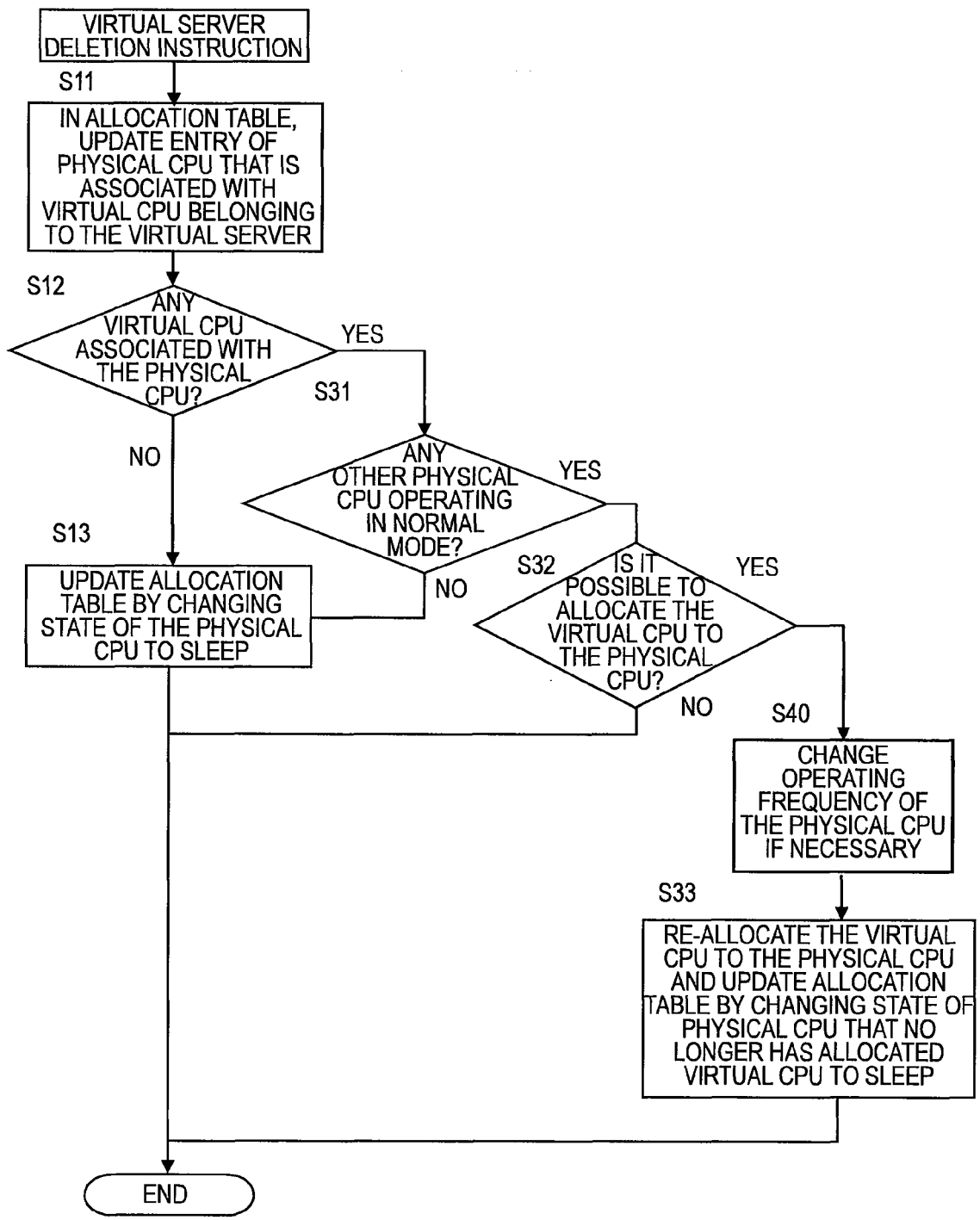
FIG. 11 is a flow chart illustrating an example of virtual CPU deleting processing that is executed by virtualization software according to a third embodiment of this invention.

FIG. 11 is a flow chart illustrating an example of virtual CPU deleting processing that is executed by virtualization software according to a third embodiment of this invention. FIG. 11 is a partially modified version of the flow chart of FIG. 9 illustrating the virtual CPU deleting processing that is executed by the virtualization software 300 according to the second embodiment. The rest is the same as in the second embodiment.

The flow chart of FIG. 11 is obtained by inserting an additional step, Step S40, between Steps S32 and S33 of the flow chart of FIG. 9. Step S40 is a step of changing the operating clock frequency of the physical CPUs 410 to 412.

In Step S40, whether or not the operating clock frequency of one of the physical CPUs 410 to 412 that is currently selected can be changed is judged as in Steps S21 and S22 of FIG. 8 described in the second embodiment and, when it is possible, the operating clock frequency is changed to suit new allocation.

Specifically, in the example of FIG. 10 in which the virtual CPU #2 allocated to the physical CPU #3 is deleted and the virtual CPU #4 allocated to the physical CPU #3 is reallocated to the physical CPU #1, the operating clock frequency of the physical CPU #1 is changed to one suitable for the new total virtual CPU allocation ratio of the physical CPU #1. The total virtual CPU allocation ratio is compared against a threshold (e.g., 90%) as in the second embodiment and, when the total virtual CPU allocation ratio is smaller than the threshold, the physical CPU #1 can be set to an operating clock frequency fit to the value of the total virtual CPU allocation ratio.

By lowering the operating clock frequency of a physical CPU to which virtual CPUs are assembled to a level suited to the total virtual CPU allocation ratio in this manner, an increase in power consumption can be prevented while keeping the processing performance of the physical computer 400 high.

Figure 12:
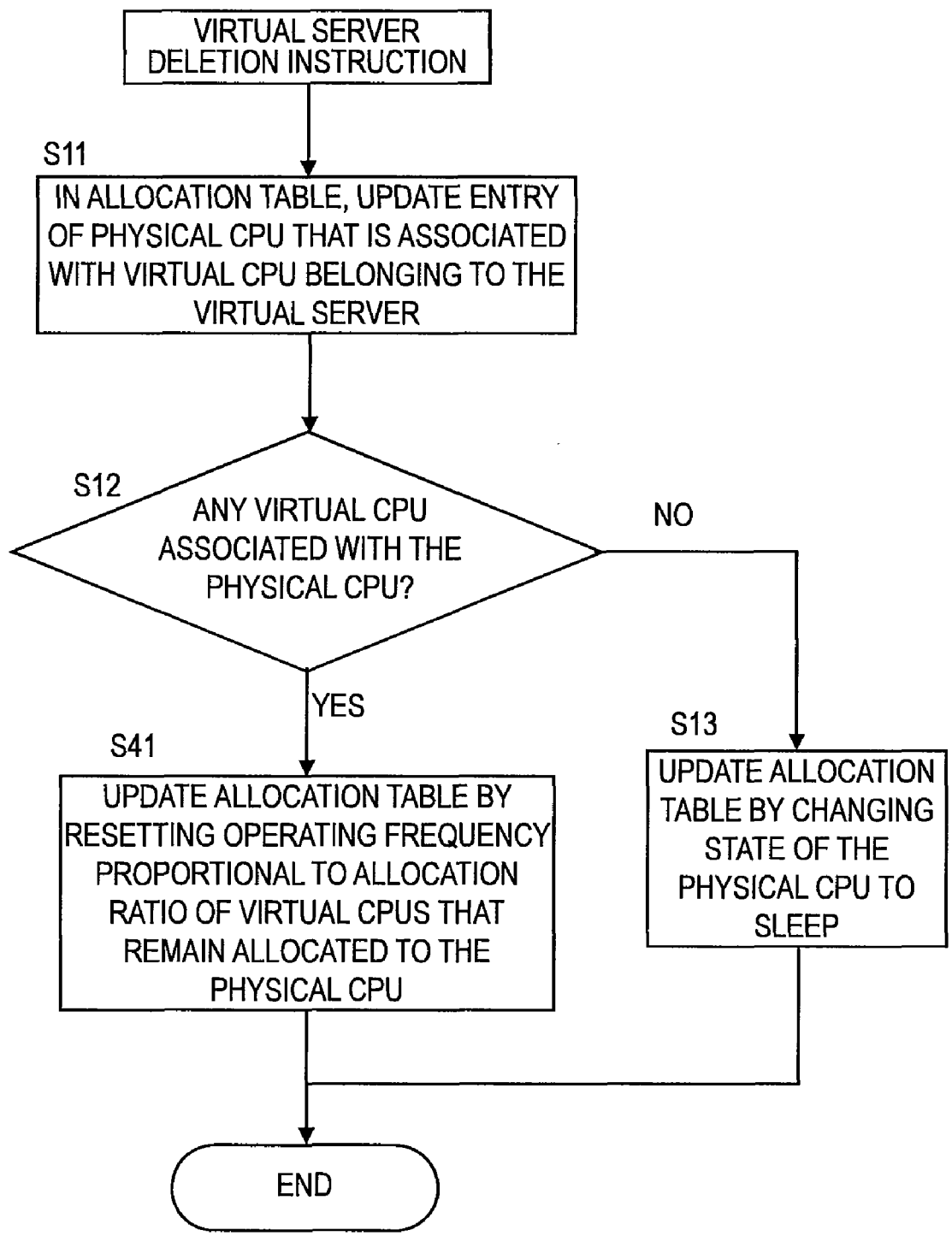
FIG. 12 is a flow chart illustrating another example of the virtual CPU deleting processing that is executed by the virtualization software according to the third embodiment.

The above-mentioned change in operating clock frequency of the physical CPUs 410 to 412 is also applicable to the virtual CPU deletion described in the first embodiment with reference to FIG. 6. In this case, Step S41 is executed when the answer to Step S12 is "Yes" as illustrated in FIG. 12. FIG. 12 is a flow chart illustrating another example of the virtual CPU deleting processing that is executed by the virtualization software according to the third embodiment.

In Step S41, whether or not the operating clock frequency of one of the physical CPUs 410 to 412 that is currently selected can be changed is judged as in Step S40 of FIG. 11 and, when it is possible, the operating clock frequency is changed to suit new allocation. Specifically, the operating clock frequency is changed to suit the sum of the allocation ratios of virtual CPUs remaining allocated to the physical CPU that has been allocated the deleted virtual CPU. In this case, the total virtual CPU allocation ratio is compared against a threshold, and the change in operating clock frequency may be allowed only when the sum of the allocation ratios of the remaining virtual CPUs is smaller than the given threshold.

In this way, the operating clock frequency can be set to a level necessary to execute virtual CPUs and the power consumption of the physical computer 400 can be further reduced.

Fourth Embodiment

Figure 13:
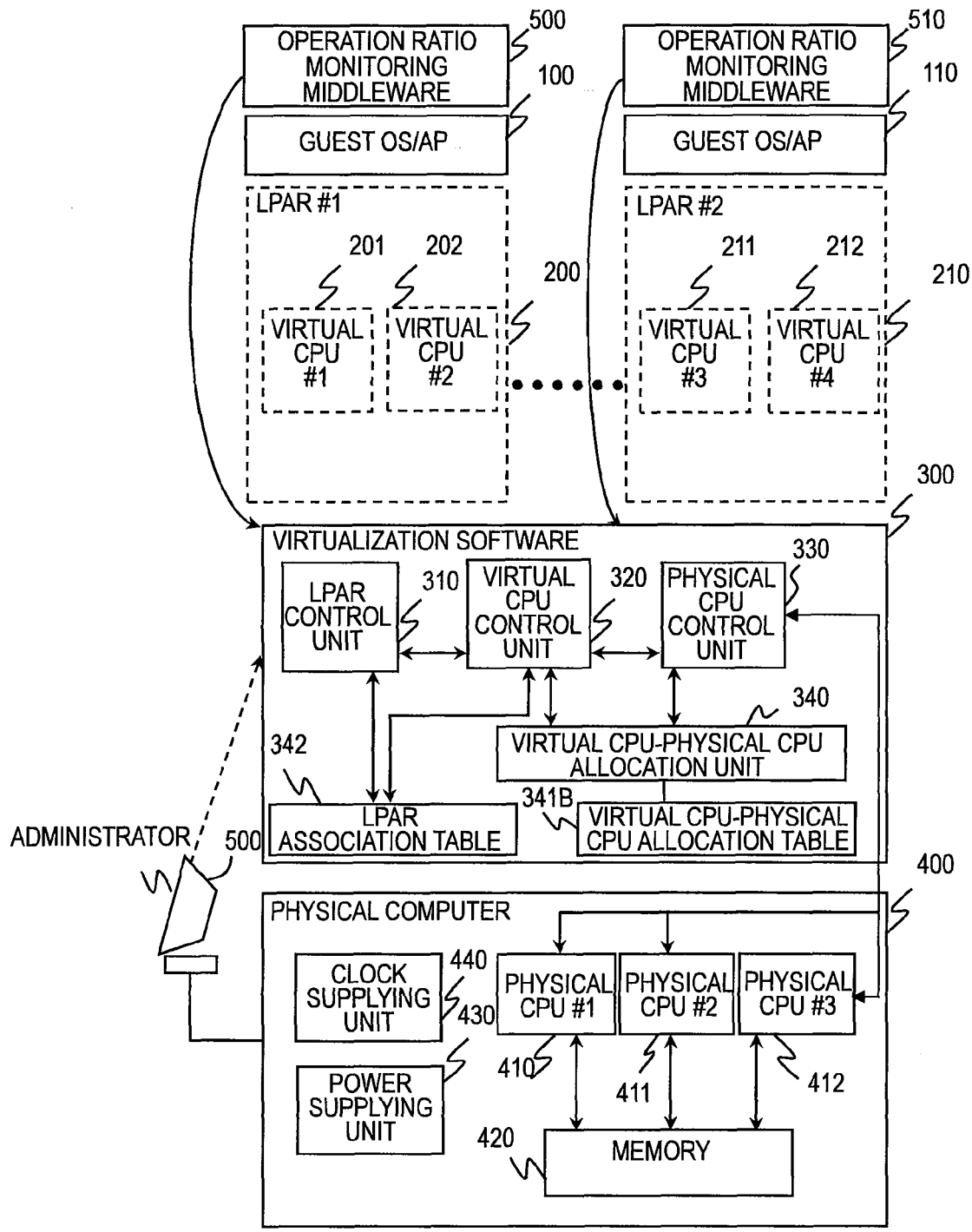
FIG. 13 is a block diagram illustrating a configuration of a virtual computer system according to a fourth embodiment of this invention.

FIG. 13 is a block diagram illustrating a configuration of a virtual computer system according to a fourth embodiment of this invention. In FIG. 13, the virtual CPU utilization ratio (hereinafter referred to as operation ratio) of each guest OS is monitored by operation ratio monitoring middleware 500 and 510, which are run on the guest OSs 100 and 110 of the first embodiment and which notifies the virtualization software 300 of the operation ratio. The virtual CPU-physical CPU allocation unit 340 of the virtualization software 300 of FIG. 13 controls allocation of virtual CPUs to physical CPUs based on the virtual CPU operation ratio.

FIG. 14 is an explanatory diagram illustrating an example of a virtual CPU-physical CPU allocation table that is managed by virtualization software according to the fourth embodiment. The virtual CPU-physical CPU allocation unit 340 manages a virtual CPU-physical CPU allocation table 341B, which is, as illustrated in FIG. 14, obtained by adding an operation ratio 3415 and an actual utilization ratio 3416 to the virtual CPU-physical CPU allocation table 341 of FIG. 3 described in the first embodiment.

As the operation ratio 3415 of the virtual CPU-physical CPU allocation table 341B, the virtual CPU-physical CPU allocation unit 340 stores the operation ratio of each virtual CPU used by the guest OS 100 and the operation ratio of each virtual CPU used by the guest OS 110. The actual utilization ratio 3416 of the virtual CPU-physical CPU allocation table 341B is a value determined by multiplying the allocation ratio of each virtual CPU by the virtual CPU's operation ratio, and corresponds to a physical CPU utilization ratio that indicates how much is actually used by the virtual CPU.

When allocating a virtual CPU, one of the logical partitions 200 and 210 that is specified in an operation instruction from the management console 500 is allocated the virtual CPU as in the first embodiment. After virtual CPUs are allocated to the logical partitions 200 and 210, the guest OSs 100 and 110 are activated in the logical partitions 200 and 210, respectively, and the operation ratio monitoring middleware 500 and 510 are also activated to notify, at regular intervals, for example, the virtualization software 300 of the operation ratios of respective virtual CPUs used by the guest OSs 100 and 110.

Figure 15:
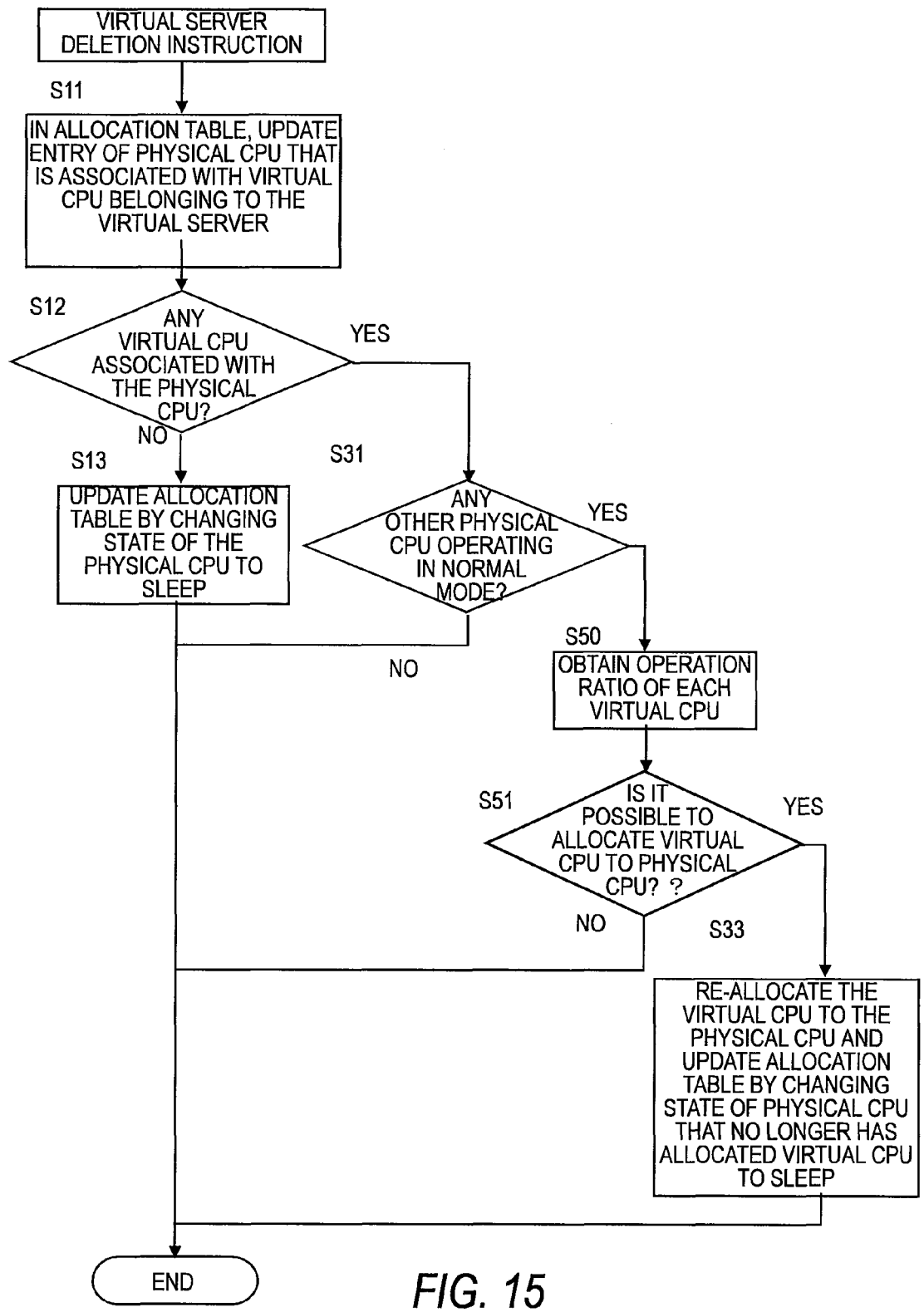
FIG. 15 is a flow chart illustrating an example of virtual CPU deleting processing that is executed by virtualization software according to the fourth embodiment.

The virtualization software 300 executes processing illustrated in a flow chart of FIG. 15 upon reception of an operation instruction from the management console 500 to delete a specified virtual CPU. Through the processing of FIG. 15, an unnecessary physical CPU among the physical CPUs 410 to 412 shifts to a sleep state and virtual CPUs are reallocated based on the operation ratios of the virtual CPUs.

FIG. 15 is a flow chart illustrating an example of virtual CPU deleting processing that is executed by virtualization software according to the fourth embodiment. The flow chart of FIG. 15 is obtained by replacing Step S32 of FIG. 9 described in the second embodiment with new steps, Steps S50 and S51, and the rest is the same as in the second embodiment. In Steps S11 and S12, a virtual CPU specified as described above is deleted and the virtual CPU-physical CPU allocation table 341B is updated. In the case where other virtual CPUs remain allocated to a physical CPU that has been allocated the deleted virtual CPU, whether or not any other physical CPU than this physical CPU is operating in a normal state is judged in Step S31. When other physical CPUs are operating in a normal state, the virtualization software 300 proceeds to Step S50 to obtain the operation ratios of virtual CPUs that are in operation in the physical computer 400.

In Step S50, the virtualization software 300 obtains the latest values out of virtual CPU operation ratios notified by the operation ratio monitoring middleware 500 and 510, or calculates a mean value of the operation ratio for each virtual CPU. The virtualization software 300 writes the obtained operation ratio of each virtual CPU as the operation ratio 3415 to update the virtual CPU-physical CPU allocation table 341B. The virtualization software 300 also obtains, for each virtual CPU, a value calculated by multiplying the allocation ratio 3413 of the virtual CPU-physical CPU allocation table 341B by the operation ratio 3415. The virtualization software 300 writes the obtained value as the actual utilization ratio 3416, which is a physical CPU utilization ratio indicating how much is actually used by the virtual CPU, thereby updating the virtual CPU-physical CPU allocation table 341B.

In Step S51, the virtual CPU-physical CPU allocation table 341B is referred to in order to judge whether or not there is a physical CPU that can be allocated all of the virtual CPUs remaining allocated to the currently selected physical CPU that has been allocated the deleted virtual CPU. Specifically, the virtualization software 300 searches for a physical CPU that are allocated virtual CPUs whose actual utilization ratios 3416 combined are such that the result of adding this combined actual utilization ratio to the totaled actual utilization ratios 3416 of all virtual CPUs remaining allocated to the physical CPU that has been allocated the deleted virtual CPU is equal to or smaller than a given second threshold (e.g., 100%). When such physical CPU is found, the virtualization software 300 selects this physical CPU as a place where the remaining virtual CPUs are to be reallocated, and proceeds to Step S33. When the result of the above addition exceeds the second threshold, on the other hand, the remaining virtual CPUs cannot be reallocated and the processing is ended at this point.

In Step S33, the remaining virtual CPUs of the physical CPU that has been allocated the deleted virtual CPU are reallocated to the physical CPU selected in Step S51, and the virtual CPU-physical CPU allocation table 341B is updated accordingly. The virtual CPU-physical CPU allocation table 341B is again updated after setting the physical CPU that no longer has allocated virtual CPUs as a result of the virtual CPU reallocation to a sleep state. The processing is then ended.

Figure 16:
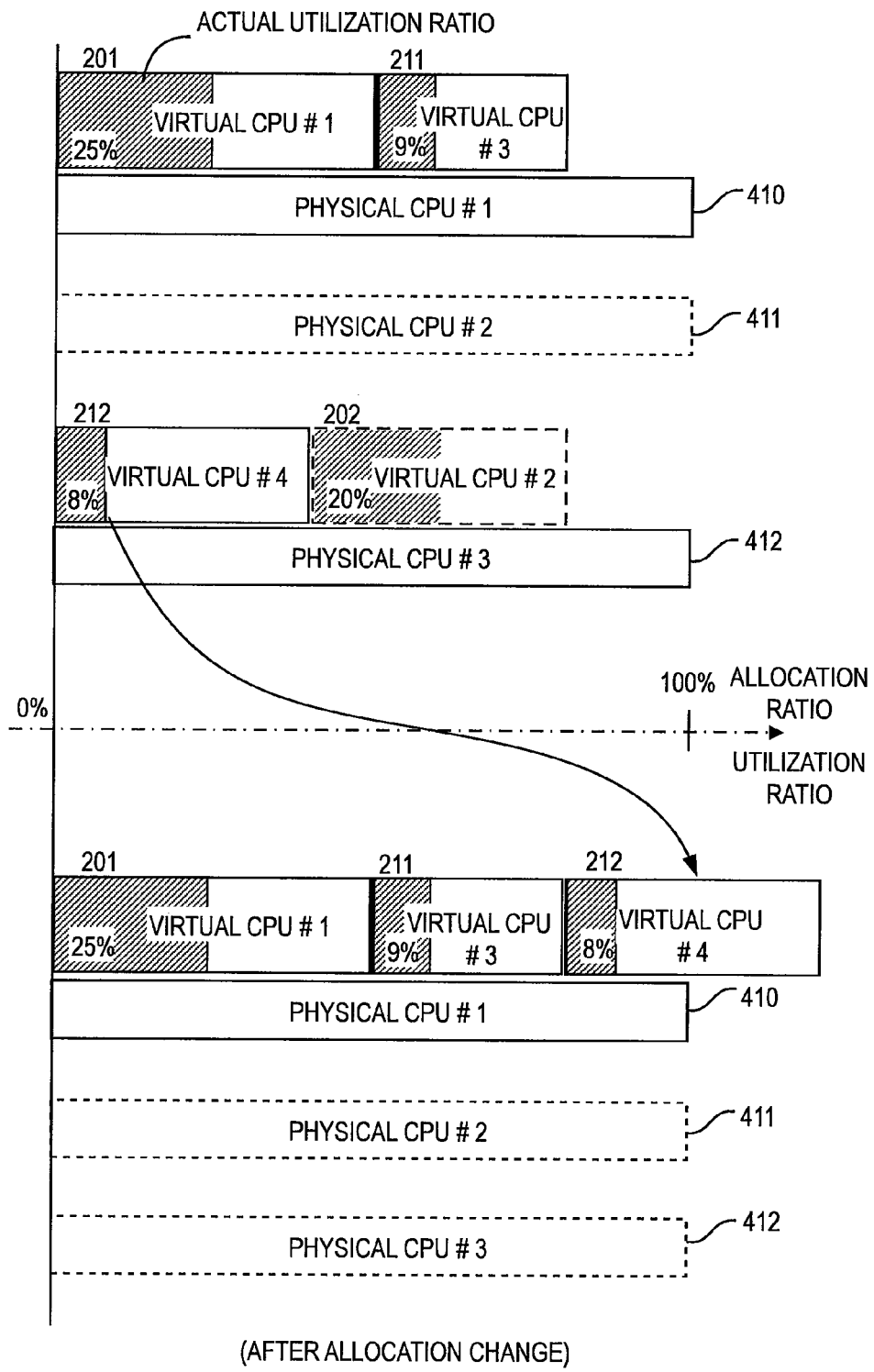
FIG. 16 is an explanatory diagram illustrating how a virtual CPU is reallocated through virtual CPU deleting processing according to the fourth embodiment.

An example of erasing the virtual CPU #2 from the virtual CPU-physical CPU allocation table 341B of FIG. 14 through the above processing is illustrated in FIG. 16.

FIG. 16 is an explanatory diagram illustrating how a virtual CPU is reallocated through virtual CPU deleting processing according to the fourth embodiment. The upper half of FIG. 16 illustrates, as the allocation before an allocation change, a state in which the virtual CPU #2 has been erased from the virtual CPU-physical CPU allocation table 341B of FIG. 14. The lower half of FIG. 16 illustrates the allocation after the virtual CPU allocation change. Hatched areas in FIG. 16 indicate the actual utilization ratios 3416 of virtual CPUS.

The physical CPU #1 is allocated the virtual CPUs #1 and #3 at an allocation ratio of 50% and an allocation ratio of 30%, respectively. The physical CPU #3 is allocated the virtual CPU #4 at an allocation ratio of 40%. The physical CPU #2 is in a sleep state.

The virtualization software 300 obtains the operation ratio 3415 of each virtual CPU from the operation ratio monitoring middleware 500 and obtains, for each virtual CPU, as the actual physical CPU utilization ratio 3416, a value that is calculated by multiplying the allocation ratio 3413 of the virtual CPU-physical CPU allocation table 341B by the operation ratio 3415 and that is expressed in percentage. The actual utilization ratio 3416 calculated for the virtual CPU #1 is 25%, 9% for the virtual CPU #3, and 8% for the virtual CPU #4. The virtualization software 300 calculates 1) the sum of the actual utilization ratios 3416 of virtual CPUs remaining allocated to the physical CPU #3 which has been allocated the deleted virtual CPU, and 2) the sum of the actual utilization ratios 3416 in a virtual CPU that is selected from among other physical CPUs operating in a normal state than the physical CPU #3 (the physical CPU #1 is selected in this example). The virtualization software 300 then adds the sum 1 and the sum 2. Since the physical CPU #1 is selected here, the sum of the actual utilization ratios 3416 in the physical CPU #3 that has been allocated the deleted virtual CPU, 8%, is added to the sum of the actual utilization ratios 3416 of the virtual CPU #1 and the virtual CPU #3, 34%. The result of the addition is 42% and the virtualization software 300 judges whether or not this calculation result is smaller than the second threshold (e.g., 100%).

In this example, the sum of the actual utilization ratios 3416 in the selected physical CPU #1 and the actual utilization ratios 3416 of the physical CPU 3416 is 42%, which is smaller than the second threshold, and the virtualization software 300 therefore judges that reallocating the virtual CPU #4 of the physical CPU #3 to the physical CPU #1 is executable. The virtualization software 300 then updates the virtual CPU-physical CPU allocation table 341B as illustrated in FIG. 17 by making the entry of the physical CPU #3 reflect the fact that no virtual CPUs are allocated to the physical CPU #3 and by writing the identifier, allocation ratio 3413, operation ratio 3415, and actual utilization ratio 3416 of the virtual CPU #4 in the entry of the physical CPU #1. Thereafter, the virtualization software 300 puts the physical CPU #3 into a sleep state and ends the processing. FIG. 17 is an explanatory diagram illustrating an example of how the virtual CPU-physical CPU allocation table managed by the virtualization software looks after the virtual CPU deletion processing is executed according to the fourth embodiment.

As a result of the virtual CPU reallocation described above, the physical CPU #1 is allocated three virtual CPUs, #1, #3 and #4, as illustrated in the lower half of FIG. 16, and the sum of the allocation ratios 3413 of the virtual CPUs #1, #3, and #4 is 120%, which exceeds the maximum resource value of the physical CPU #1, 100%. However, the physical CPU #1 can execute each virtual CPU smoothly because the sum of the actual utilization ratios 3416 of the virtual CPUs #1, #3, and #4 is smaller than 100% at 42%.

In this manner, when virtual CPUs are reallocated as a result of deleting a specified virtual CPU, the actual physical CPU utilization ratio 3416 which indicates how much is actually used by a virtual CPU is calculated for each virtual CPU from a value obtained from the operation ratio monitoring middleware 500. When the sum of the actual utilization ratios 3416 of the virtual CPUs allocated to one physical CPU and the actual utilization ratios 3416 of the virtual CPUs allocated to another physical CPU is smaller than the second threshold, the virtual CPUs of one physical CPU are reallocated to the other physical CPU. A physical CPU to which no virtual CPUs are allocated is thus created and is put into a sleep state, and hence the power consumption of the physical computer 400 can be reduced.

Further, the operation ratio monitoring middleware 500 and 510 are run on the guest OSs 100 and 110 in the logical partitions 200 and 210 to notify the virtualization software 300 of the utilization ratios of respective virtual CPUs assigned to the guest OSs 100 and 110, and hence the virtual computer system can use the virtualization software 300 to control virtual CPU allocation based on the operation ratios of virtual CPUs while using existing OSs as the guest OSs 100 and 110 without any modifications.

The second threshold in the above example is set to 100%. However, if load fluctuations of the guest OSs 100 and 110 are to be considered, setting the second threshold to a value smaller than 100%, for example, 80%, may be preferred because it enables the computer system to deal with a rapid rise in actual utilization ratio resulting from the load fluctuations.

In the case where a plurality of physical CPUs are operating in a normal state, the virtualization software 300 searches for a physical CPU that makes the sum of the actual utilization ratios smaller than the second threshold by executing Step S51 for the plurality of physical CPUs one at a time, specifically, by comparing the total actual utilization ratio in the physical CPU that has been allocated the deleted virtual CPU against the total actual utilization ratio in another physical CPU.

The embodiments described above illustrate an example of applying this invention to a homogeneous multicore multiprocessor system having a plurality of processor cores as the physical CPUs 410 to 412. This invention is also applicable to a heterogeneous multicore multiprocessor system having processor cores different from one another.

As has been described, this invention can be applied to a virtual computer system that has a plurality of physical CPUs and executes a plurality of virtual CPUs, and to virtualization software.

While the present invention has been described in detail and pictorially in the accompanying drawings, the present invention is not limited to such detail but covers various obvious modifications and equivalent arrangements, which fall within the purview of the appended claims.

What is claimed is:

1. A virtual computer system comprising:
a physical computer including a plurality of physical CPUs that is switchable between a sleep state and a normal state; and
a virtualization control unit which divides the physical computer into a plurality of logical partitions to run a guest OS in each of the plurality of logical partitions, and which controls allocation of resources of the physical computer to the plurality of logical partitions,
wherein the virtualization control unit includes:
a logical partition control unit which receives an operation instruction for operating the plurality of logical partitions;
a virtual CPU control unit which allocates virtual CPUs to the plurality of logical partitions based on the operation instruction, the virtual CPUs each executing the guest OS;
a virtual CPU-physical CPU allocation unit which allocates the virtual CPUs to the plurality of physical CPUs based on the operation instruction, and which controls operation states of the plurality of physical CPUs; and a physical CPU control unit which controls the operation states of the plurality of physical CPUs based on the operation instruction from the virtual CPU-physical CPU allocation unit, wherein the virtual CPU-physical CPU allocation unit is configured to:
- judge, upon reception of the operation instruction from the logical partition control unit to create a virtual CPU, whether or not the virtual CPU to be created can be allocated to any one of the plurality of physical CPUs that is in the normal state;
- allocate the created virtual CPU to the any one of the plurality of physical CPUs that is in the normal state in a case where the allocation of the created virtual CPU is executable;
- issue an instruction to the physical CPU control unit to activate one of the plurality of physical CPUs that is in the sleep state, and allocate the created virtual CPU to the activated one of the plurality of physical CPUs in a case where the allocation of the created virtual CPU is not executable; and
- update a table for managing virtual CPU-physical CPU allocation and the operation states of the plurality of physical CPUs by adding the allocated created virtual CPU to the table, and wherein the virtual CPU-physical CPU allocation unit is configured to:
- delete, upon reception of the operation instruction from the logical partition control unit to delete a virtual CPU, the deleted virtual CPU from the table; and
- instruct the physical CPU control unit to put into the sleep state one of the plurality of physical CPUs that has been allocated the deleted virtual CPU in a case where the deletion leaves no virtual CPUs allocated thereto.

2. The virtual computer system according to claim 1, wherein the virtual CPU-physical CPU allocation unit is configured to:
- search, after the deleted virtual CPU is deleted from the table, the table for a second virtual CPU allocated to a first physical CPU, the first physical CPU being the physical CPU that has been allocated the deleted virtual CPU;
- reallocate the second virtual CPU to a second physical CPU, in a case where the second virtual CPU is found and allocating the second virtual CPU to a second physical CPU is executable, the second physical CPU being one of the plurality of physical CPUs that is in the normal state; and
- put the first physical CPU into the sleep state in a case where the reallocation leaves no virtual CPUs allocated to the first physical CPU.

3. The virtual computer system according to claim 1, wherein the plurality of physical CPUs each have a clock control unit which changes an operating clock frequency, wherein the operation instruction includes an allocation ratio that is a ratio of the length of time each of the virtual CPUs is allocated to one of the plurality of logical partitions to the total length of time one of the plurality of physical CPUs is allocated to any one of the plurality of logical partitions, wherein the virtual CPU-physical CPU allocation unit determines the operating clock frequency of the one of the plurality of physical CPUs based on a sum of allocation ratios of the virtual CPUs that are allocated to the one of the plurality of physical CPUs, in a case where allocation of virtual CPUs to one of the plurality of physical CPUs is changed, and sends the determined operating clock frequency to the physical CPU control unit, and wherein the physical CPU control unit sends the received operating clock frequency to the clock control unit.

4. The virtual computer system according to claim 1, wherein the plurality of logical partitions each include an operation state detecting unit which detects operation ratios of virtual CPUs used by the guest OS and notifies the virtualization control unit of the operation ratios, and wherein, in a case where allocation of virtual CPUs to one of the plurality of physical CPUs is changed, the virtual CPU-physical CPU allocation unit changes the allocation of the virtual CPUs based on a sum of the operation ratios of the allocated virtual CPUs that are allocated to the one of the plurality of physical CPUs.

5. The virtual computer system according to claim 4, wherein, upon reception of the operation instruction from the logical partition control unit to delete the deleted virtual CPU, the virtual CPU-physical CPU allocation unit is configured to:
- search, after the deleted virtual CPU is deleted from the table, the table for a second virtual CPU allocated to a first physical CPU, the first physical CPU being a physical CPU that has been allocated the deleted virtual CPU;
- obtain the operation ratios from the operation state detecting unit to calculate a sum of the operation ratios of virtual CPUs that are allocated to a second physical CPU, in a case where the second virtual CPU is found, the second physical CPU being one of the plurality of physical CPUs that is in the normal state;
- add an operation ratio of the second virtual CPU to the sum of the operation ratios in the second physical CPU;
- reallocate the second virtual CPU to the second physical CPU in a case where a result of the addition is smaller than a given threshold; and
- put the first physical CPU into the sleep state in a case where the reallocation leaves no virtual CPUs allocated to the first physical CPU.

6. The virtual computer system according to claim 5, wherein the virtual CPU-physical CPU allocation unit allows a value calculated by adding an allocation ratio of the second virtual CPU to a sum of allocation ratios of the virtual CPUs that are allocated to the second physical CPU to exceed 100%, as long as a value calculated by adding the operation ratio of the second virtual CPU to the sum of the operation ratios of the virtual CPUs that are allocated to the second physical CPU is smaller than the given threshold.

7. A method of controlling a virtual computer system in which a physical computer includes a plurality of physical CPUs that is switchable between a sleep state and a normal state, and a virtualization control unit divides the physical computer into a plurality of logical partitions to run a guest OS in each of the plurality of logical partitions and controls allocation of resources of the physical computer to the plurality of logical partitions, the method comprising:
- receiving, by the virtualization control unit, an operation instruction for operating the plurality of logical partitions;
- in a case where the received operation instruction is an operation instruction to create a virtual CPU for executing the guest OS in one of the plurality of logical partitions, judging, by the virtualization control unit, whether or not the virtual CPU to be created can be allocated to any one of the plurality of physical CPUs that is in the normal state to:

allocate the created virtual CPU to the any one of a plurality of physical CPUs that is in the normal state in a case where the allocation of the created virtual CPU is executable; and activate one of the plurality of physical CPUs that is in the sleep state and allocate the created virtual CPU to the activated one of the plurality of physical CPUs in a case where the allocation of the created CPU is not executable;

updating, by the virtualization control unit, a table for managing virtual CPU-physical CPU allocation and operation states of the plurality of physical CPUs by adding the allocated created virtual CPU to the table; and in a case where the received operation instruction is an operation instruction to delete a virtual CPU from one of the plurality of logical partitions, deleting, by the virtualization control unit, the deleted virtual CPU from the table and putting into the sleep state one of the plurality of physical CPUs that has been allocated the deleted virtual CPU in a case where the deleting leaves no virtual CPUs allocated thereto.

8. The method of controlling a virtual computer system according to claim 7, wherein the deleting the virtual CPU from the table and the putting into the sleep state one of the plurality of physical CPUs that has been allocated the deleted virtual CPU includes:

deleting the deleted virtual CPU from the table;

searching the table to judge whether or not a second virtual CPU allocated to a first physical CPU is found in the table and whether or not the second virtual CPU can be allocated to a second physical CPU, the first physical CPU being the physical CPU that has been allocated the deleted virtual CPU, the second physical CPU being one of the plurality of physical CPUs that is in the normal state; and reallocating the second virtual CPU to a second physical CPU, in a case where the allocation is judged to be executable, and putting the first physical CPU into the sleep state in a case where the reallocating leaves no virtual CPUs allocated to the first physical CPU.

9. The method of controlling a virtual computer system according to claim 7, wherein the plurality of physical CPUs each have a clock control unit which changes an operating clock frequency, wherein the operation instruction includes an allocation ratio that is a ratio of length of time a virtual CPU is allocated to one of the plurality of logical partitions to the total length of time one of the plurality of physical CPUs is allocated to any one of the plurality of logical partitions, wherein the allocating the created virtual CPU to the activated one of the plurality of physical CPUs includes changing the operating clock frequency of the one of the plurality of physical CPUs based on a sum of allocation ratios of virtual CPUs that are allocated to the one of the plurality of physical CPUs to which the virtual CPU is newly allocated, and wherein the deleting the virtual CPU from the table and the putting into the sleep state one of the plurality of physical CPUs that has been allocated the deleted virtual CPU includes changing the operating clock frequency of the one of the plurality of physical CPUs based on the sum of the allocation ratios of the allocated virtual CPUs in a case where the one of the plurality of physical CPUs has other virtual CPUs allocated thereto.

10. The method of controlling a virtual computer system according to claim 7, further comprising detecting operation ratios of virtual CPUs that are used by the guest OS and notifying the virtualization control unit of the operation ratios, wherein the deleting the virtual CPU from the table and the putting into the sleep state one of the plurality of physical CPUs that has been allocated the deleted virtual CPU includes changing allocation of virtual CPUs based on a sum of the operation ratios of the allocated virtual CPUs in a case where the one of the plurality of physical CPUs has other virtual CPUs allocated.

11. The method of controlling a virtual computer system according to claim 10, wherein the deleting the virtual CPU from the table and the putting into the sleep state one of the plurality of physical CPUs that has been allocated the deleted virtual CPU includes:

searching, after the deleted virtual CPU is deleted from the table, the table for a second virtual CPU allocated to a first physical CPU, the first physical CPU being a physical CPU that has been allocated the deleted virtual CPU;

obtaining the operation ratios to calculate a sum of the operation ratios of virtual CPUs that are allocated to a second physical CPU, in a case where the second virtual CPU is found, the second physical CPU being one of the plurality of physical CPUs that is in the normal state;

adding an operation ratio of the second virtual CPU to the sum of the operation ratios of virtual CPUs that are allocated to the second physical CPU;

reallocating the second virtual CPU to the second physical CPU in a case where a result of the adding is smaller than a given threshold; and putting the first physical CPU into the sleep state in a case where the reallocating leaves no virtual CPUs allocated to the first physical CPU.

12. The method of controlling a virtual computer system according to claim 11, wherein the deleting the virtual CPU from the table and the putting into the sleep state one of the plurality of physical CPUs that has been allocated the deleted virtual CPU includes allowing a value calculated by adding an allocation ratio of the second virtual CPU to a sum of allocation ratios of the virtual CPUs that are allocated to the second physical CPU to exceed 100%, as long as a value calculated by adding the operation ratio of the second virtual CPU to the sum of the operation ratios of the virtual CPUs that are allocated to the second physical CPU is smaller than the given threshold.

13. A storage medium recorded with a program which divides a physical computer including a plurality of physical CPUs that is switchable between a sleep state and a normal state into a plurality of logical partitions to run a guest OS in each of the plurality of logical partitions, and which controls allocation of resources of the physical computer to the plurality of logical partitions, the program controlling the physical computer to perform:

receiving an operation instruction for operating the plurality of logical partitions;

in a case where the received operation instruction is an operation instruction to create a virtual CPU for executing the guest OS in one of the plurality of logical partitions, judging whether or not the virtual CPU to be created can be allocated to any one of the plurality of physical CPUs that is in the normal state to:

allocate the created virtual CPU to the any one of the plurality of physical CPUs that is in the normal state in a case where the allocation of the created virtual CPU is executable; and activate one of the plurality of physical CPUs that is in the sleep state and allocate the created virtual CPU to the activated one of the plurality of physical CPUs in a case where the allocation of the created CPU is not executable;

updating a table for managing virtual CPU-physical CPU allocation and operation states of the plurality of physical CPUs by adding the allocated created virtual CPU to the table; and in a case where the received operation instruction is an operation instruction to delete a virtual CPU from one of the plurality of logical partitions, deleting the deleted virtual CPU from the table and putting into the sleep state one of the plurality of physical CPUs that has been allocated the deleted virtual CPU in a case where the deleting leaves no virtual CPUs allocated thereto.

14. The storage medium according to claim 13, wherein the deleting the virtual CPU from the table and the putting into the sleep state one of the plurality of physical CPUs that has been allocated the deleted virtual CPU includes:

deleting the deleted virtual CPU from the table;

searching the table to judge whether or not a second virtual CPU allocated to a first physical CPU is found in the table, and whether or not the second virtual CPU can be allocated to a second physical CPU, the first physical CPU being the physical CPU that has been allocated the deleted virtual CPU, the second physical CPU being one of the plurality of physical CPUs that is in the normal state; and reallocating the second virtual CPU to a second physical CPU, in a case where the allocation is judged to be executable, and putting the first physical CPU into the sleep state in a case where the reallocating leaves no virtual CPUs allocated to the first physical CPU.

15. The storage medium according to claim 13, wherein the plurality of physical CPUs each have a clock control unit which changes an operating clock frequency, wherein the operation instruction includes an allocation ratio that is a ratio of length of time a virtual CPU is allocated to one of the plurality of logical partitions to the total length of time one of the plurality of physical CPUs is allocated to any one of the plurality of logical partitions, wherein the allocating the created virtual CPU to the activated one of the plurality of physical CPUs includes changing the operating clock frequency of the one of the plurality of physical CPUs based on a sum of allocation ratios of virtual CPUs that are allocated to the one of the plurality of physical CPUs to which the virtual CPU is newly allocated, and wherein, the deleting the virtual CPU from the table and the putting into the sleep state one of the plurality of physical CPUs that has been allocated the deleted virtual CPU includes changing the operating clock frequency of the one of the plurality of physical CPUs based on the sum of the allocation ratios of the allocated virtual CPUs in a case where the one of the plurality of physical CPUs has other virtual CPUs allocated thereto.

16. The storage medium according to claim 13, further comprising detecting operation ratios of virtual CPUs that are used by the guest OS and notifying the virtualization control unit of the operation ratios, wherein the deleting the virtual CPU from the table and the putting into the sleep state one of the plurality of physical CPUs that has been allocated the deleted virtual CPU includes changing allocation of virtual CPUs based on a sum of the operation ratios of the allocated virtual CPUs in a case where the one of the plurality of physical CPUs has other virtual CPUs allocated.

17. The storage medium according to claim 16, wherein the deleting the virtual CPU from the table and putting, in a case where the deleting leaves no virtual CPUs allocated to one of the plurality of physical CPUs that has been allocated the deleted virtual CPU, the one of the plurality of physical CPUs into the sleep state comprises:

searching, after the deleted virtual CPU is deleted from the table, the table for a second virtual CPU allocated to a first physical CPU, the first physical CPU being a physical CPU that has been allocated the deleted virtual CPU;

obtaining the operation ratios to calculate a sum of the operation ratios of virtual CPUs that are allocated to a second physical CPU, in a case where the second virtual CPU is found, the second physical CPU being one of the plurality of physical CPUs that is in the normal state;

adding an operation ratio of the second virtual CPU to the sum of the operation ratios of virtual CPUs that are allocated the second physical CPU;

reallocating the second virtual CPU to the second physical CPU in a case where a result of the adding is smaller than a given threshold; and putting the first physical CPU into the sleep state in a case where the reallocating leaves no virtual CPUs allocated to the first physical CPU.

18. The storage medium according to claim 17, wherein the deleting the virtual CPU from the table and the putting into the sleep state one of the plurality of physical CPUs that has been allocated the deleted virtual CPU includes allowing a value calculated by adding an allocation ratio of the second virtual CPU to a sum of allocation ratios of the virtual CPUs that are allocated to the second physical CPU to exceed 100%, as long as a value calculated by adding the operation ratio of the second virtual CPU to the sum of the operation ratios of the virtual CPUs that are allocated to the second physical CPU is smaller than the given threshold.

* * * * *